(12) United States Patent
Zeng et al.

(10) Patent No.: US 12,390,857 B2
(45) Date of Patent: Aug. 19, 2025

(54) LASER POWDER BED FUSION FORMING DEVICE AND METHOD FOR LARGE-SIZE RING/FRAME-SHAPED METAL PIECE

(71) Applicant: HUAZHONG UNIVERSITY OF SCIENCE AND TECHNOLOGY, Hubei (CN)

(72) Inventors: Xiaoyan Zeng, Hubei (CN); Kaiwen Wei, Hubei (CN); Youguang Fan, Hubei (CN); Mengna Liu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 604 days.

(21) Appl. No.: 17/680,324

(22) Filed: Feb. 25, 2022

(65) Prior Publication Data

US 2022/0203450 A1 Jun. 30, 2022

Related U.S. Application Data

(63) Continuation of application No. PCT/CN2020/117719, filed on Sep. 25, 2020.

(30) Foreign Application Priority Data

Sep. 6, 2019 (CN) .......................... 201910843575.2

(51) Int. Cl.
*B22F 10/28* (2021.01)
*B22F 10/322* (2021.01)
(Continued)

(52) U.S. Cl.
CPC ............ *B22F 10/28* (2021.01); *B22F 10/322* (2021.01); *B22F 10/36* (2021.01); *B22F 12/30* (2021.01);
(Continued)

(58) Field of Classification Search
CPC ........ B22F 10/28; B22F 10/322; B22F 10/36; B22F 12/30; B22F 12/41; B22F 12/45;
(Continued)

(56) References Cited

U.S. PATENT DOCUMENTS 8,550,802 B2 * 10/2013 Fuwa ..................... B33Y 30/00
425/375
9,604,282 B2 * 3/2017 Abe ....................... B33Y 40/00
(Continued)

FOREIGN PATENT DOCUMENTS

| CN | 102328081 | 1/2012 |
| CN | 103726049 | 4/2014 |

(Continued)

OTHER PUBLICATIONS

CN106799494, Zeng et al., abstract, (Year: 2017).*

(Continued)

*Primary Examiner* — Jessee R Roe
*Assistant Examiner* — Michael Aboagye
(74) *Attorney, Agent, or Firm* — JCIPRNET

(57) ABSTRACT

A laser powder bed fusion forming device for a large-size ring/frame-shaped metal piece. Said device includes a forming cylinder, a substrate, a galvanometer array and a dust removal module. The forming cylinder is ring/frame-shaped and is adapted to the inner and outer contours of the ring/frame-shaped metal piece to be formed. The substrate is also ring/frame-shaped and is arranged inside the forming cylinder. The galvanometer array is located above the forming cylinder, includes a plurality of galvanometer systems, and the corresponding scanning areas thereof cover the upper surface of the forming cylinder. The dust removal module is located between the forming cylinder and the galvanometer array, and is used for forming a circulating air flow field which is distributed along the radial direction of (Continued)

the ring-shaped metal piece or along the circumscribed circle of the horizontal cross-section of the frame-shaped metal piece or along some other specific directions.

19 Claims, 14 Drawing Sheets

(51) Int. Cl.
| | |
|---|---|
| *B22F 10/36* | (2021.01) |
| *B22F 12/30* | (2021.01) |
| *B22F 12/41* | (2021.01) |
| *B22F 12/45* | (2021.01) |
| *B22F 12/49* | (2021.01) |
| *B22F 12/70* | (2021.01) |
| *B33Y 10/00* | (2015.01) |
| *B33Y 30/00* | (2015.01) |
| *B33Y 40/00* | (2020.01) |
| *B22F 10/366* | (2021.01) |
| *B22F 10/77* | (2021.01) |

(52) U.S. Cl.
CPC .............. *B22F 12/41* (2021.01); *B22F 12/45* (2021.01); *B22F 12/49* (2021.01); *B22F 12/70* (2021.01); *B33Y 10/00* (2014.12); *B33Y 30/00* (2014.12); *B33Y 40/00* (2014.12); *B22F 10/366* (2021.01); *B22F 10/77* (2021.01); *B22F 2998/10* (2013.01)

(58) Field of Classification Search
CPC ........ B22F 12/49; B22F 12/70; B22F 10/366; B22F 10/00; B33Y 10/00; B33Y 30/00; B33Y 40/00; B33Y 50/02
USPC ........ 419/6, 61, 38, 48; 219/121.73, 121.78, 219/121.79, 121.86; 700/118, 119
See application file for complete search history.

(56) References Cited

U.S. PATENT DOCUMENTS

| | | | | |
|---|---|---|---|---|
| 10,807,194 B2 * | 10/2020 | Bour | .................... | B29C 64/153 |
| 10,821,514 B2 * | 11/2020 | Corsmeier | ............ | B33Y 30/00 |

FOREIGN PATENT DOCUMENTS

| | | | | |
|---|---|---|---|---|
| CN | 106799494 | * | 6/2017 | ............. B22F 12/70 |
| CN | 107876760 | | 4/2018 | |
| CN | 107900343 | | 4/2018 | |
| CN | 109261966 | | 1/2019 | |
| CN | 110538995 | | 12/2019 | |
| CN | 210966978 | | 7/2020 | |
| JP | 2011026668 | | 2/2011 | |

OTHER PUBLICATIONS

CN106799494, Zeng et al., Description, (Year: 2017).*
CN106799494, Zeng et al., claims (Year: 2017).*
"International Search Report (Form PCT/ISA/210) of PCT/CN2020/117719," mailed on Dec. 21, 2021, with English translation thereof, pp. 1-6.
"Written Opinion of the International Searching Authority (Form PCT/ISA/237) of PCT/CN2020/117719," mailed on Dec. 21, 2021, pp. 1-5.

* cited by examiner

LASER POWDER BED FUSION FORMING DEVICE AND METHOD FOR LARGE-SIZE RING/FRAME-SHAPED METAL PIECE

CROSS-REFERENCE TO RELATED APPLICATION

This application is a continuation of international PCT application serial no. PCT/CN2020/117719, filed on Sep. 25, 2020, which claims the priority benefit of China application no. 201910843575.2, filed on Sep. 6, 2019. The entirety of each of the above-mentioned patent applications is hereby incorporated by reference herein and made a part of this specification.

BACKGROUND

Technical Field

The disclosure belongs to the field of advanced manufacturing technology, and in particular, relates to a laser powder bed fusion forming device and method adapted for large-size ring-shaped and frame-shaped metal pieces.

Description of Related Art

In the field of producing and manufacturing, a large number of large-size ring-shaped and frame-shaped metal pieces are included. However, with the upgrading and replacing of related equipment and the increasing frequency of introduction of new parts and pieces, conventional processing technologies such as casting, forging, and welding have gradually been unable to meet the manufacturing needs of such parts and pieces due to problems such as slow response speed, numerous process links, and long processing cycles.

Laser powder bed fusion technology is currently a research hotspot in the field of laser additive manufacturing (commonly known as 3D printing). The process is provided as follows: First, the computer aid design (CAD) model of the part to be formed is sliced and processed, and the laser scanning trajectory of each sliced layer is generated. Second, the surface of the substrate located inside the forming cylinder is coated with a layer of metal powders. Through the galvanometer system, according to the sliced pattern of the part, the movement track of the laser beam is controlled, the selected area of the metal powder bed is scanned and melted, and the metal molten pool is rapidly cooled and solidified to form a deposition layer. Next, the substrate is lowered by one slice layer thickness, and the process of "powder pre-laying and spreading→laser powder bed fusion→substrate lowering" is repeated until the formation of all deposition layers is completed, and the overall manufacturing of metal pieces is finally achieved. Obviously, the laser powder bed fusion technology has the advantages of short response time, simple process flow, high processing accuracy, complex structure forming, excellent product performance, and strong material universality, and thus is expected to bring a new way to the manufacturing of various large-size ring-shaped and frame-shaped metal pieces.

However, the laser powder bed fusion technology and equipment at home and abroad provided by the related art generally use cylindrical or square columnar forming cylinders and substrates. Such a structure is more suitable for forming small-size or solid parts. However, when it is used to form large-size ring-shaped metal pieces or frame-shaped metal pieces, a large amount of redundant metal powders must be used to fill the area surrounded by the part deposition layer (as shown in FIG. 1A and FIG. 1B), resulting in low powder utilization and a sharp increase in raw material costs.

During the laser powder bed fusion forming process, the interaction of laser beams and metal powders may form a large amount of smoke and dust. The smoke and dust are mainly composed of splashed droplets, powders, and burnt metal particles, and if the smoke and dust are not removed in time, they may land on the metal powder bed, the part deposition layer, or the equipment cavity surface, and stability of the subsequent forming process may thus be affected. The dust removal system provided by the laser powder bed fusion equipment of the related art generally consists of an air suctioning mechanism, an air blowing mechanism, and a smoke and dust purification host containing a circulating fan and a filter medium connected to the air suctioning mechanism and the air blowing mechanism. Herein, the air suctioning mechanism and the air blowing mechanism are usually fixed on both sides of a cylindrical or square columnar forming cylinder, as shown in FIG. 1A and FIG. 1B. When large-size ring-shaped or frame-shaped metal pieces are to be formed, due to the large breadth of the forming cylinder, the air suctioning openings of the air suctioning mechanism is far away from the air blowing openings of the air blowing mechanism, and therefore it is difficult to generate a stable and uniform circulating air flow above the metal powder layer. If the average flow rate of the circulating air flow is too low, it will not be enough to eliminate all the smoke and dust, and the resulting deterioration of product quality and even formation failure are not uncommon. If the average flow rate of the circulating air flow is too high, part of the metal powders on the surface of the powder bed may be taken away all together, which not only causes additional loss of raw materials, but also affects the flatness of the powder layer, resulting in a decrease in the forming quality.

In view of the foregoing, development of a piece of laser powder bed fusion forming equipment requiring small amount of redundant powders and exhibiting good smoke and dust purification effect and high forming efficiency for large-size ring-shaped and frame-shaped metal pieces is an important issue.

SUMMARY

In view of the above technical shortcomings or improvement needs of the related art, the disclosure provides a laser powder bed fusion forming device and method for large-size ring/frame-shaped metal pieces with an aim to significantly reduce the amount of redundant powders during laser powder bed fusion forming of a metal piece, significantly improve the smoke and dust purification effect, and enhance the forming efficiency, such that high-efficiency, low-cost, and high-quality additive manufacturing of a large-size ring/frame-shaped complex metal component may be achieved.

To achieve the above, according to an aspect of the disclosure, the disclosure provides a laser powder bed fusion forming device for large-size ring/frame-shaped metal pieces, and the device includes a forming cylinder, a substrate, a galvanometer array, and a dust removal module, where:

The forming cylinder is ring/frame-shaped and is adapted to inner and outer contours of a large-size ring/frame-shaped metal piece to be formed, and the substrate is also ring/frame-shaped and is arranged inside the forming cylinder.

The galvanometer array is located above the forming cylinder and includes a plurality of galvanometer systems, all corresponding scanning areas of the galvanometer systems cover the upper surface of the forming cylinder or all scanning areas cover the upper surface of the forming cylinder through movement of the galvanometer systems, such that simultaneous selective melting forming of the large-size ring/frame-shaped metal piece with a plurality of laser beams is implemented.

The dust removal module is located between the forming cylinder and the galvanometer array and is used for forming a circulating air flow field which is distributed along a radial direction of the large-size ring-shaped metal piece or distributed radially along a circumscribed circle of a horizontal cross-section of the large-size frame-shaped metal piece or distributed along a normal direction of a frame of the large-size frame-shaped metal piece, or for forming segments of a plurality of circulating air flow fields which are distributed in a circumferential direction of the large-size ring-shaped metal piece or distributed in a circumferential direction of the frame of the large-size frame-shaped metal piece to accordingly achieve removal of smoke and dust.

In a preferred embodiment, the dust removal module is a group, which includes an air suctioning mechanism and an air blowing mechanism. Herein, the shape of the air suctioning mechanism is adapted to an outer contour of the ring-shaped forming cylinder or a circumscribed circle of an outer contour of the frame-shaped forming cylinder, and the air suctioning mechanism is located above the outer side of the forming cylinder and is provided with a plurality of air suctioning openings arranged into a ring shape. The shape of the air blowing mechanism is adapted to an inner contour of the ring-shaped forming cylinder or an inscribed circle of an inner contour of the frame-shaped forming cylinder, and the air blowing mechanism is located above the inner side of the forming cylinder, is located on an inner side of the air suctioning mechanism, and is provided with air blowing openings corresponding to the air suctioning openings. The circulating air flow field which is distributed along the radial direction of the large-size ring-shaped metal piece or distributed radially along the circumscribed circle of the horizontal cross-section of the large-size frame-shaped metal piece is formed through matching of the air suctioning openings and the corresponding air blowing openings.

Alternatively, the shape of the air suctioning mechanism is adapted to an inner contour of the ring-shaped forming cylinder or an inscribed circle of an inner contour of the frame-shaped forming cylinder, and the air suctioning mechanism is located above an inner side of the forming cylinder and is provided with a plurality of air suctioning openings arranged into a ring shape. The shape of the air blowing mechanism is adapted to an outer contour of the ring-shaped forming cylinder or a circumscribed circle of an outer contour of the frame-shaped forming cylinder, and the air blowing mechanism is located above an outer side of the forming cylinder, is located on an outer side of the air suctioning mechanism, and is provided with air blowing openings corresponding to the air suctioning openings. The circulating air flow field which is distributed along the radial direction of the large-size ring-shaped metal piece or distributed radially along the circumscribed circle of the horizontal cross-section of the large-size frame-shaped metal piece is formed through matching of the air suctioning openings and the corresponding air blowing openings.

In a preferred embodiment, when the object to be formed is a large-size frame-shaped metal piece, the dust removal module is a group, which includes an air suctioning mechanism and an air blowing mechanism. Herein, the shape of the air suctioning mechanism is adapted to the outer contour of the frame-shaped forming cylinder, and the air suctioning mechanism is located above the outer side of the forming cylinder and is provided with a plurality of air suctioning openings parallel to the frame of the frame-shaped metal piece. The shape of the air blowing mechanism is adapted to the inner contour of the frame-shaped forming cylinder, and the air blowing mechanism is located above the inner side of the forming cylinder, is located on the inner side of the air suctioning mechanism, and is provided with air blowing openings corresponding to the air suctioning openings. The circulating air flow field which is distributed along the normal direction of the frame of the large-size frame-shaped metal piece is formed through matching of the air suctioning openings and the corresponding air blowing openings.

Alternatively, the shape of the air suctioning mechanism is adapted to the inner contour of the frame-shaped forming cylinder, and the air suctioning mechanism is located above the inner side of the forming cylinder and is provided with a plurality of air suctioning openings parallel to the frame of the metal piece. The shape of the air blowing mechanism is adapted to the outer contour of the frame-shaped forming cylinder, and the air blowing mechanism is located above the outer side of the forming cylinder, is located on the outer side of the air suctioning mechanism, and is provided with air blowing openings corresponding to the air suctioning openings. The circulating air flow field which is distributed along the normal direction of the frame of the large-size frame-shaped metal piece is formed through matching of the air suctioning openings and the corresponding air blowing openings.

In a preferred embodiment, a plurality of dust removal modules in a plurality of groups are provided, a number of the dust removal modules is identical to a number of the galvanometer systems, and each group of the dust removal module is located under the corresponding galvanometer system and moves synchronously with the galvanometer system.

In a preferred embodiment, the dust removal module includes an air suctioning mechanism and an air blowing mechanisms separately arranged on both sides of the galvanometer system. The air suctioning mechanism is provided with a plurality of air suctioning openings, and the air blowing mechanism is provided with air blowing openings corresponding to the air suctioning openings. The circulating air flow fields which are distributed in the circumferential direction of the large-size ring-shaped metal piece or distributed in the circumferential direction of the frame of the large-size frame-shaped metal piece are formed through matching of the air suctioning openings and the corresponding air blowing openings.

In a preferred embodiment, a distance between an inner surface of an outer wall of the forming cylinder and an outer contour of a metal piece deposition layer is 0.1 mm to 150 mm, preferably 1 mm to 20 mm, and a distance between an outer surface of an inner wall of the forming cylinder and an inner contour of the metal piece deposition layer is 0.1 mm to 150 mm, preferably 1 mm to 20 mm.

In a preferred embodiment, power and a beam diameter of a laser beam outputted by each galvanometer system are respectively controlled at 500 W to 10 kW and 0.1 mm to 10 mm. Preferably, the galvanometer system is a two-axis scanning galvanometer system or a dynamic focus scanning galvanometer system.

In a preferred embodiment, an average flow velocity of the air flow fields formed between the air suctioning openings and the corresponding air blowing openings is 0.5 m/s to 5 m/s, preferably 1 m/s to 3 m/s.

In a preferred embodiment, a distance between the dust removal module and the upper surface of the forming cylinder is 1 mm to 300 mm, preferably 5 mm to 100 mm, and a distance between the air suctioning openings of the air suctioning mechanism and the corresponding air blowing openings of the corresponding air blowing mechanism is 5 mm to 500 mm, preferably 200 mm to 400 mm. Preferably, the forming cylinder further includes a workbench, and the forming cylinder is embedded in the workbench.

According to another aspect of disclosure, the disclosure further provides a laser powder bed fusion forming method for large-size ring/frame-shaped metal pieces, and the method is performed by adopting the aforementioned forming device. The method includes the following steps:

S1: A CAD model of the large-size ring/frame-shaped metal piece to be formed is sliced to generate a laser scanning path of each metal deposition layer. The dust removal module is turned on for forming the circulating air flow field which is distributed along the radial direction of the large-size ring-shaped metal piece or distributed radially along the circumscribed circle of the horizontal cross-section of the large-size frame-shaped metal piece or distributed along the normal direction of the frame of the large-size frame-shaped metal piece above the forming cylinder, or for forming segments of the circulating air flow fields which are distributed in the circumferential direction of the large-size ring-shaped metal piece or distributed in the circumferential direction of the frame of the large-size frame-shaped metal piece.

S2: The height of the substrate is adjusted such that the upper surface thereof overlaps with the upper surface of the forming cylinder, and the upper surface of the substrate is coated with metal powders with a predetermined thickness.

S3: The galvanometer systems in the galvanometer array performs simultaneous selective melting forming on a metal powder layer with a plurality of laser beams according to a predetermined scanning path to form a first deposition layer of the metal piece. Or, the galvanometer systems in the galvanometer array perform simultaneous selective melting on a metal powder layer covered by a current scanning breadth with a plurality of laser beams according to a predetermined scanning path, and then the galvanometer systems and the corresponding dust removal modules are moved in the circumferential direction of the large-size ring-shaped metal piece or the circumferential direction of the frame of the large-size frame-shaped metal piece after scanning of a coverage range of the current scanning breadth is completed, and then simultaneous selective melting is continuously performed on remaining metal powders layers with a plurality of laser beams until formation of the first deposition layer of the metal piece is completed.

S4: The substrate is lowered to a same height as a thickness of the deposition layer, and a layer of metal powders with a predetermined thickness is coated on the deposition layer again.

S5: The galvanometer systems in the galvanometer array perform simultaneous selective melting forming on a metal powder layer with a plurality of laser beams according to the predetermined scanning path to complete formation of a next deposition layer of the metal piece. Or, the galvanometer systems in the galvanometer array perform simultaneous selective melting on a metal powder layer covered by the current scanning breadth with a plurality of laser beams according to the predetermined scanning path, and then the galvanometer systems and the corresponding dust removal modules are moved in the circumferential direction of the large-size ring-shaped metal piece or the circumferential direction of the frame of the large-size frame-shaped metal piece after scanning of the coverage range of the current scanning breadth is completed, and then simultaneous selective melting is continuously performed on the remaining metal powder layers with a plurality of laser beams until formation of the next deposition layer of the metal piece is completed.

S6: Steps S4 to S5 are repeatedly performed until the laser powder bed fusion forming for the large-size ring or frame-shaped metal piece is completed.

In general, the above technical solutions provided by the disclosure have the following technical advantages compared to the related art.

1. In the disclosure, by designing the ring/frame-shaped forming cylinder and the ring/frame-shaped substrate that are adapted to the shape of the large-size ring/frame-shaped metal piece, the metal piece deposition layer may occupy the area surrounded by the forming cylinder and the substrate as much as possible during the laser powder bed fusion process. In this way, the redundant powder filling amount may be significantly reduced, and the costs of powder raw materials may be significantly reduced.

2. Regarding the large-size ring-shaped metal piece, in the disclosure, the circulating air flow field distributed in the radial direction of the metal piece or segments of circulating air flow fields distributed in the circumferential direction of the metal piece are arranged above the forming cylinder. Regarding the large-size frame-shaped metal piece, in the disclosure, the circulating air flow field distributed radially along the circumscribed circle of the horizontal cross-section of the metal piece, or the circulating air flow field distributed in the normal direction of the frame of the metal piece, or segments of circulating air flow fields distributed in the circumferential direction of the frame of the metal piece are arranged above the forming cylinder. These arrangements significantly reduce the actual distance between the air blowing openings and the air suctioning openings of the dust removal module, the stability and uniformity of the circulating air flow field are thereby ensured, and high-efficiency removal of smoke and dust and high-quality forming of metal pieces are therefore achieved.

3. In the disclosure, the specific structure and arrangement of the dust removal module are also studied and designed. Three types of dust removal module structures are obtained through the research, so as to form the circulating air flow field which is distributed along the radial direction or distributed radially along the circumscribed circle or distributed along the normal direction of the frame of the large-size ring/frame-shaped metal piece, and to form the circulating air flow field which is distributed in the circumferential direction or distributed in the circumferential direction of the frame of the large-size ring/frame-shaped metal piece.

4. In the disclosure, the distance parameters between the inner and outer side walls of the forming cylinder and the inner and outer contours of the deposition layer of the large-size ring/frame-shaped metal piece are also studied and designed, and the optimal parameters are obtained. In this way, the amount of redundant powder filling may be greatly reduced, the side walls of the forming cylinder and the contours of the metal piece deposition layer may be prevented from interfering with the shapes and positions, and the movement accuracy of the forming cylinder and the forming accuracy of the metal piece may also be ensured.

5. In the disclosure, important parameters such as the distance between the dust removal module and the upper surface of the forming cylinder, the distance between the air suctioning openings and the corresponding air blowing openings, and the flow velocity of the circulating air flow generated by the dust removal module are also studied and designed, and the optimal parameters are obtained. In this way, it is ensured that the smoke and dust are effectively eliminated and the metal powders may not be taken away all together, and the forming quality is thereby further guaranteed.

6. The laser powder bed fusion device provided by the disclosure uses the same control system, software algorithms, etc. as the laser powder bed fusion equipment of the related art and therefore may be implemented with less difficulty and may be easily applied.

BRIEF DESCRIPTION OF THE DRAWINGS

In all drawings, the same reference numerals are used to denote the same elements or structures, where.

Figure 1A:
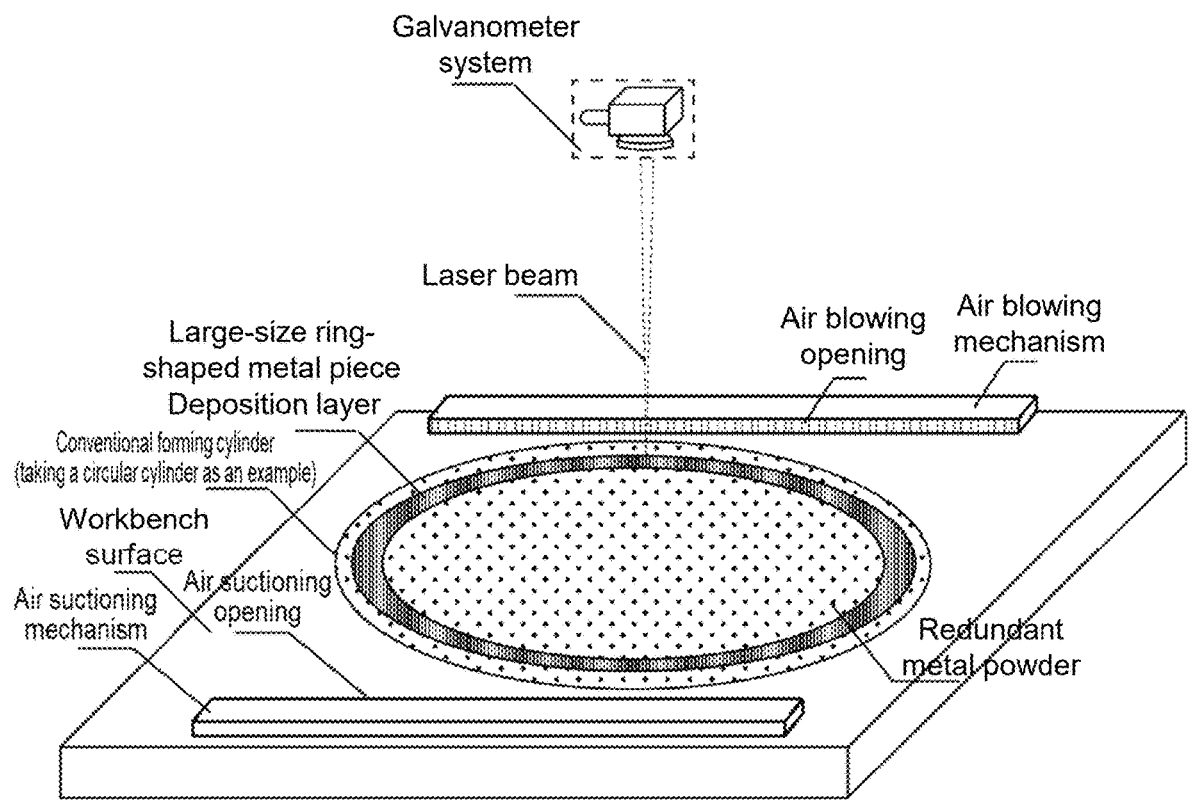
FIG. 1A and FIG. 1B respectively are schematic diagrams of processes of forming large-size ring-shaped and frame-shaped metal pieces with laser powder bed fusion equipment of the related art.
Figure 1B:
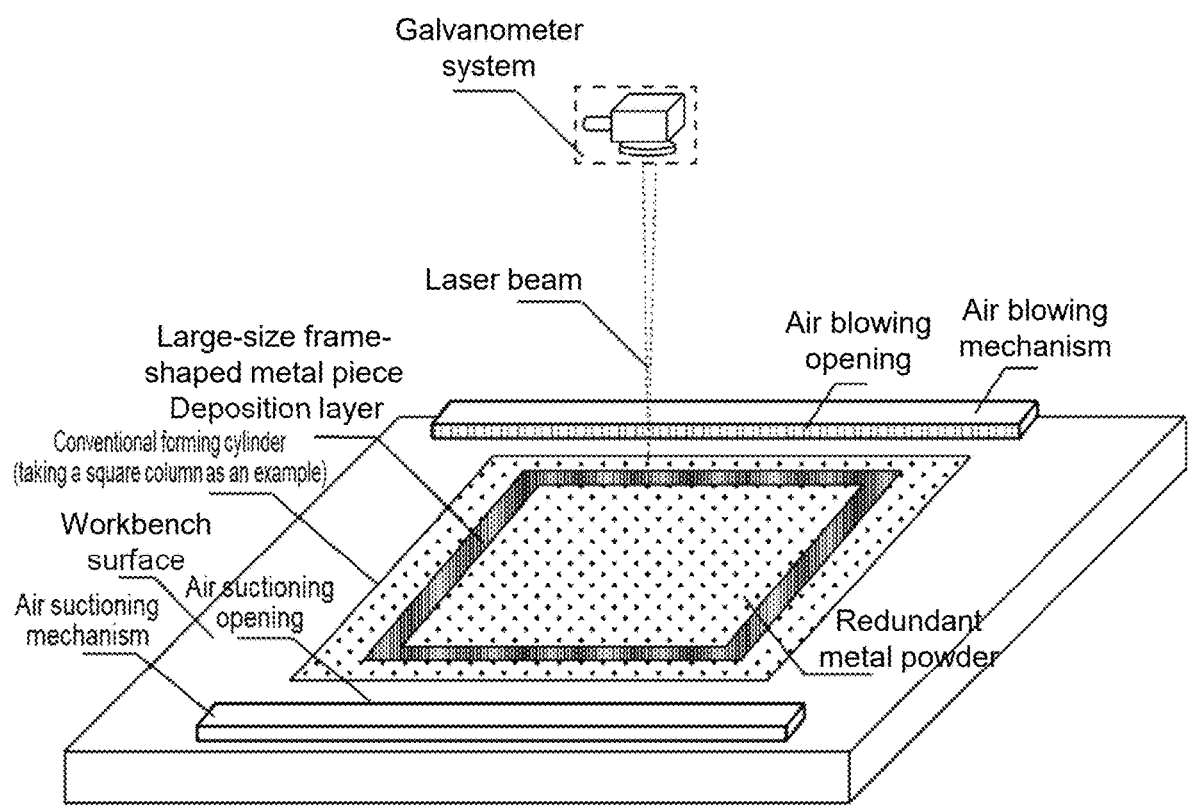

1—workbench, 2—forming cylinder, 21—forming cylinder outer wall, 22—forming cylinder inner wall, 3—substrate, 4—galvanometer system, 5—laser beam, 6—air suctioning opening, 7—air blowing opening, 8—circulating air flow field, and 9—metal piece deposition layer.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

The disclosure aims at the specific problem of presence of a large amount of redundant metal powders when a piece of laser powder bed fusion equipment of the related art is used to form large-size ring-shaped and frame-shaped metal pieces (generally referring to a ring-shaped metal piece with an outer diameter of not less than 250 mm and a wall thickness of not greater than 30 mm and a frame-shaped metal piece with a maximum frame length of not less than 250 mm and a wall thickness of not greater than 30 mm), that is, the forming equipment of the related art is not suitable for forming of large-size ring and frame-shaped metal pieces. The disclosure has carried out special research and design to study and obtain a piece of laser powder bed fusion forming equipment suitable for large-size ring and frame-shaped metal pieces featuring a small amount of redundant powders, good smoke purification effect, and high forming efficiency.

This research and design include two parts. One is to study and design the basic structure of a forming device suitable for a specific object (i.e., a large-size ring-shaped metal piece and a large-size frame-shaped metal piece) of the disclosure, and the other is to solve the problems that occur in the actual forming process. For the first part, the disclosure starts with the specific structure of a forming cylinder and the specific arrangement of galvanometer systems. A forming cylinder 2 is designed in a ring shape or a frame shape, and is adapted to inner and outer contours of a large-size ring-shaped or frame-shaped metal piece to be formed. To be specific, the forming cylinder 2 includes a forming cylinder outer wall 21 and a forming cylinder inner wall 22 which are coaxially arranged. The forming cylinder outer wall 21 is located outside an outer contour of a deposition layer of a large-size ring-shaped or frame-shaped metal piece, and the forming cylinder inner wall 22 is located inside an inner contour of the deposition layer of the large-size ring-shaped or frame-shaped metal piece. A ring-shaped or frame-shaped substrate 3 is arranged inside the forming cylinder 2, and the substrate 3 acts as a bottom plate for metal deposition. Metal powders to be deposited are deposited on the substrate, and up and down movement of a deposition layer may be achieved by the up and down movement of the substrate.

Figure 2:
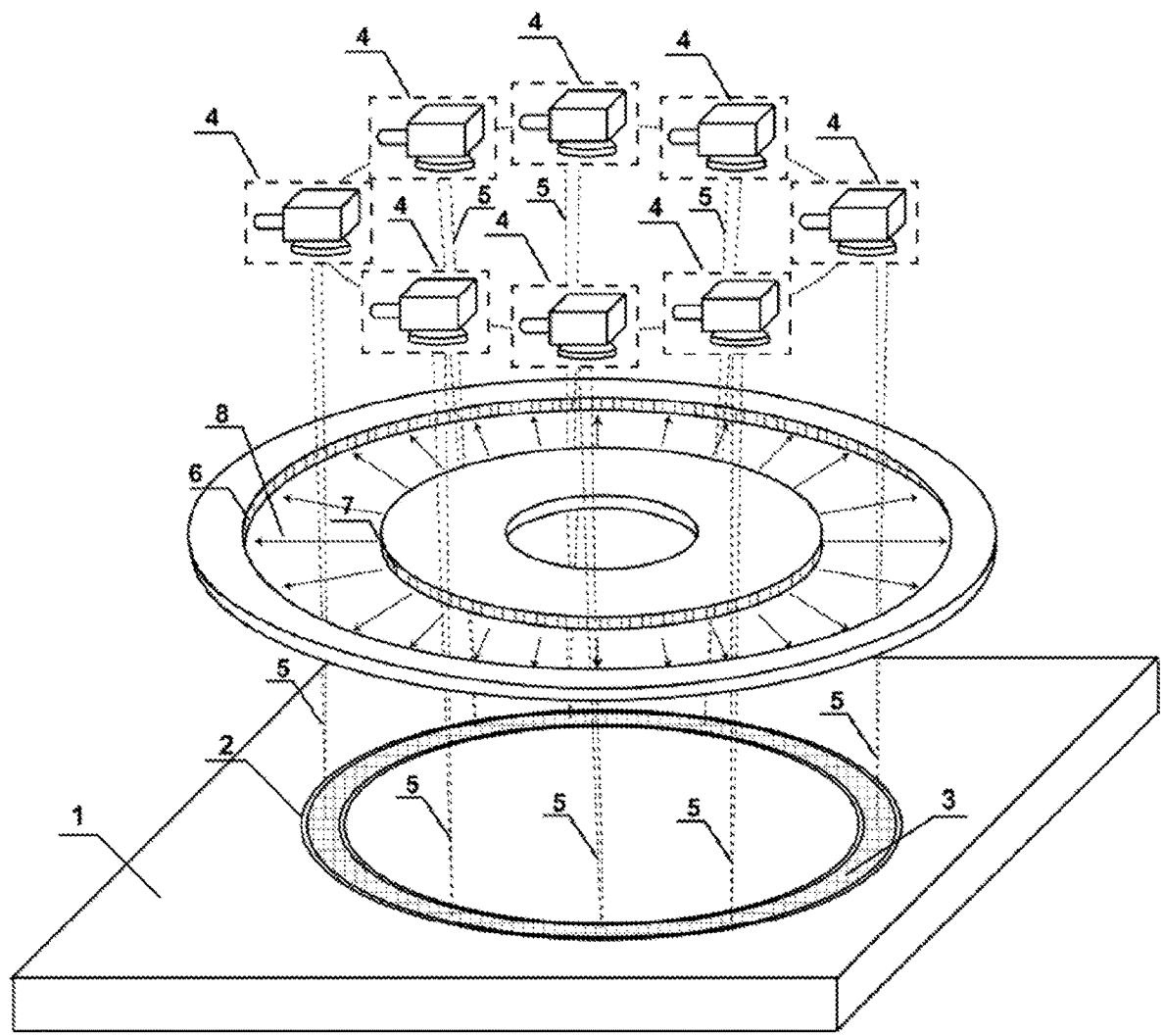
FIG. 2 is a schematic view of a structure of a laser powder bed fusion forming device for the large-size ring-shaped metal piece provided by embodiment 1 of the disclosure.
Figure 5:
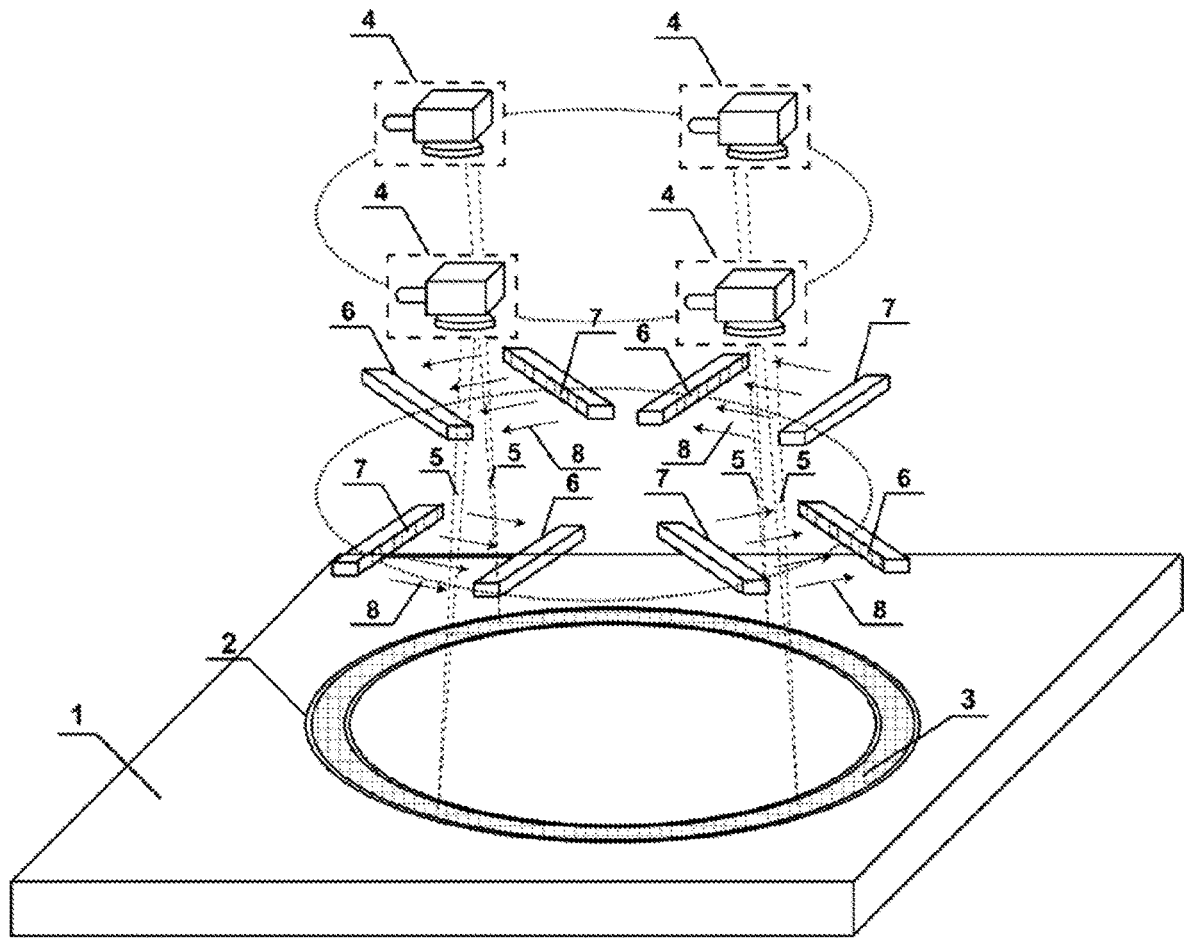
FIG. 5 is a schematic view of the structure of the laser powder bed fusion forming device for the large-size ring-shaped metal piece provided by embodiment 3 of the disclosure.

A galvanometer array is disposed above the forming cylinder 2, and when the metal piece and the forming cylinder are both in a ring shape, the galvanometer array includes N (N≥2, preferably N≥4) galvanometer systems 4 uniformly arranged in a ring shape. To be specific, the galvanometer systems 4 are two-axis scanning galvanometer systems or dynamic focus scanning galvanometer systems. All corresponding scanning areas of the galvanometer systems 4 entirely cover the upper surface of the forming cylinder 2, and through simultaneous operating of the galvanometer systems 4, simultaneous selective melting forming for the large-size ring-shaped metal piece with a plurality of laser beams is implemented. For instance, as shown in FIG. 2, the galvanometer array includes eight galvanometer systems 4, and the scanning area of each galvanometer system 4 is one-eighth (i.e., one-eighth ring) of the upper surface of the forming cylinder. All scanning areas of the eight galvanometer systems exactly cover the entire upper surface of the forming cylinder, and through simultaneous operating of the eight galvanometer systems 4, simultaneous selective melting forming for the large-size ring-shaped metal piece with a plurality of laser beams is implemented. Alternatively, through circular movement of the galvanometer systems 4, all scanning areas may cover the upper surface of the forming cylinder, and simultaneous selective melting forming for the large-size ring-shaped metal piece with a plurality of laser beams is implemented. For instance, as shown in FIG. 5, the galvanometer array includes four galvanometer systems 4, and the scanning area of each galvanometer system 4 is one-eighth (i.e., one-eighth ring) of the upper surface of the forming cylinder. All scanning areas of the four galvanometer systems 4 are one-half of the upper surface of the forming cylinder. Through movement of four galvanometer systems 4 across one-eighth (i.e., one-eighth ring) of the upper surface of the forming cylinder in a circumferential direction of the large-size ring-shaped metal piece move, all scanning areas of the four galvanometer systems 4 cover the upper surface of the forming cylinder 2.

Figure 6:
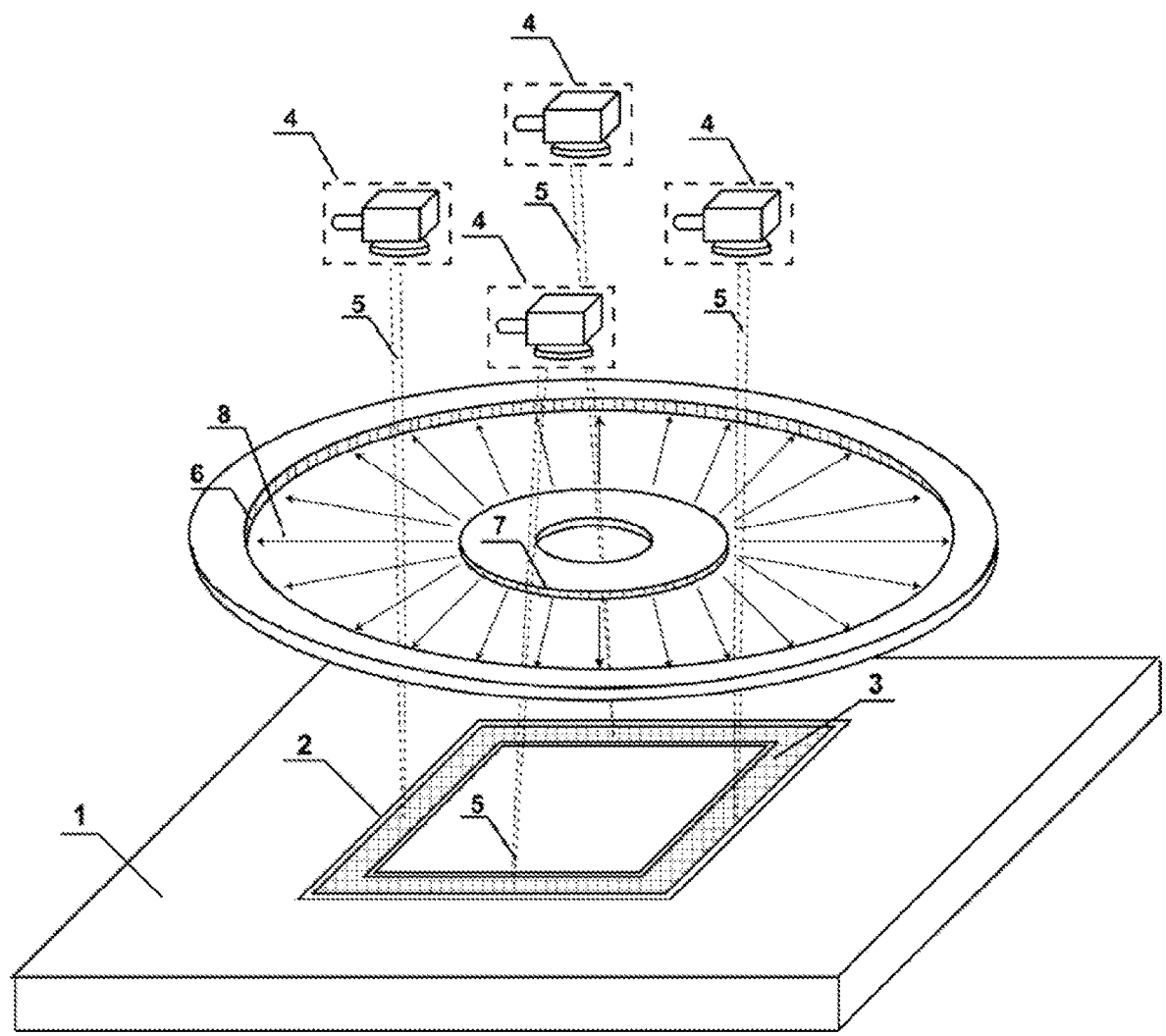
FIG. 6 is a schematic view of a structure of a laser powder bed fusion forming device for a large-size square frame-shaped metal piece provided by embodiment 4 of the disclosure.
Figure 10:
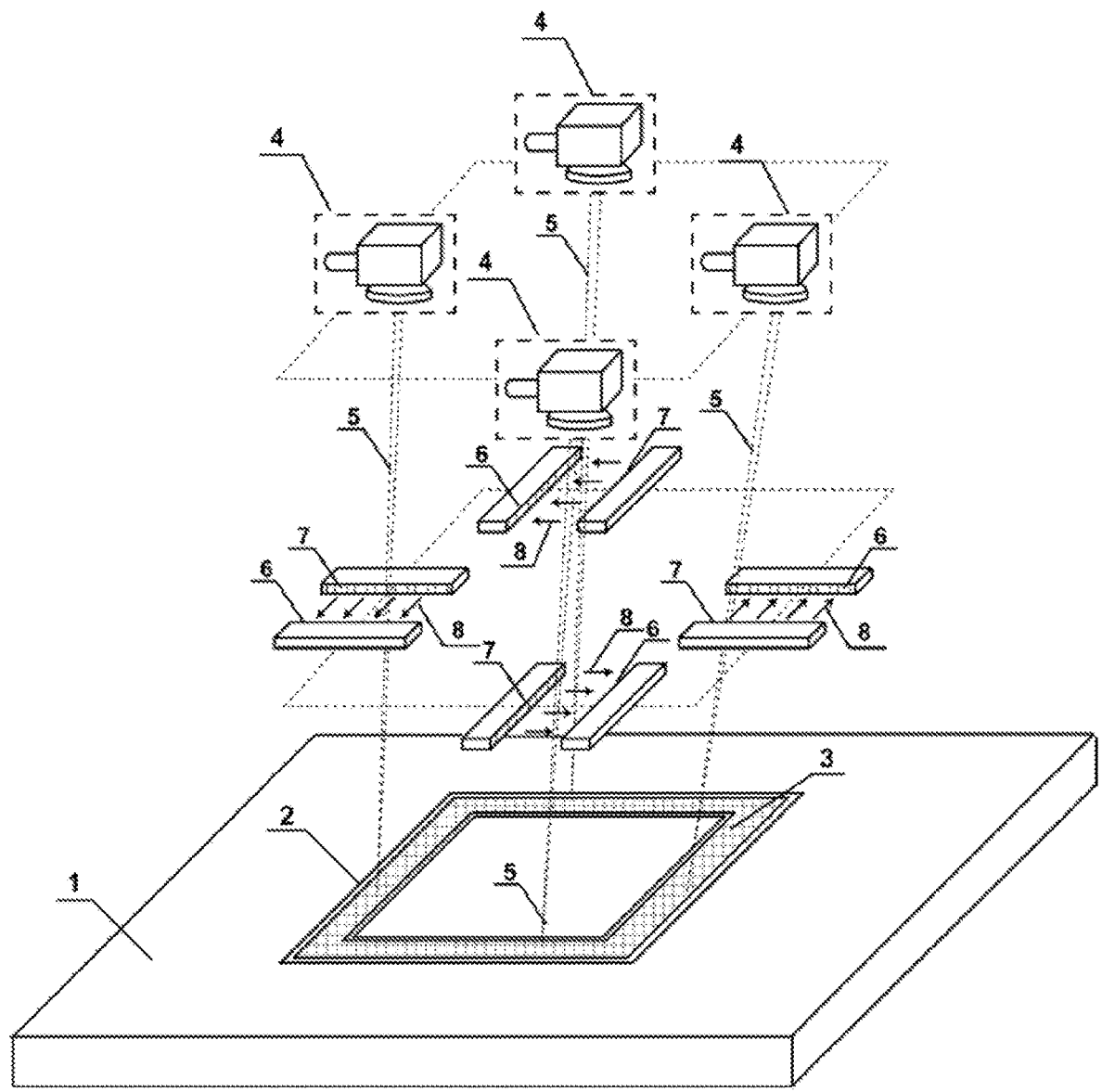
FIG. 10 is a schematic view of the structure of the laser powder bed fusion forming device for the large-size square frame-shaped metal piece provided by embodiment 8 of the disclosure.
Figure 11:
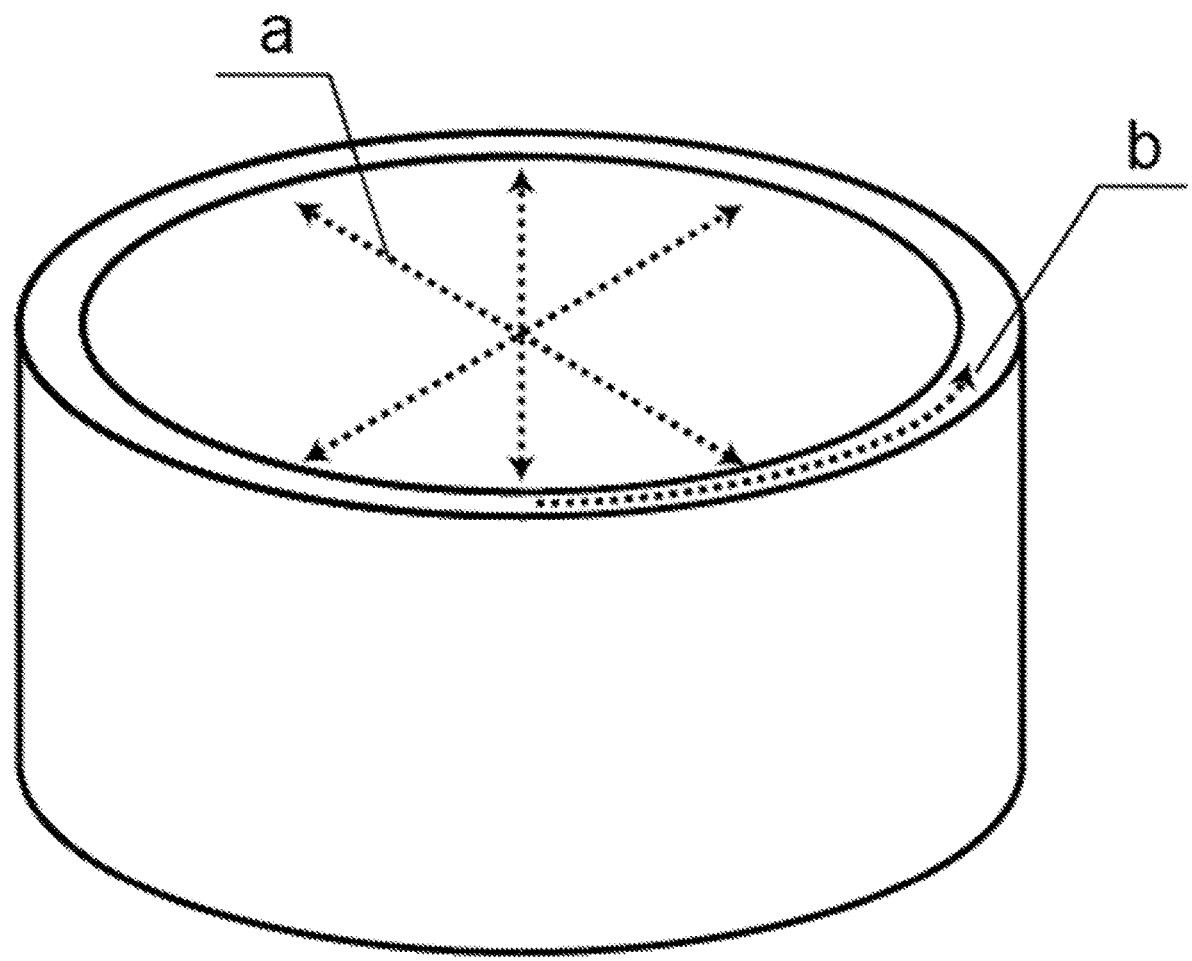
FIG. 11 is a schematic view of a structure of a typical large-size ring-shaped metal piece, where a is a radial direction (from inside to outside or from outside to inside), and b is a circumferential direction (clockwise or counterclockwise).
Figure 12:
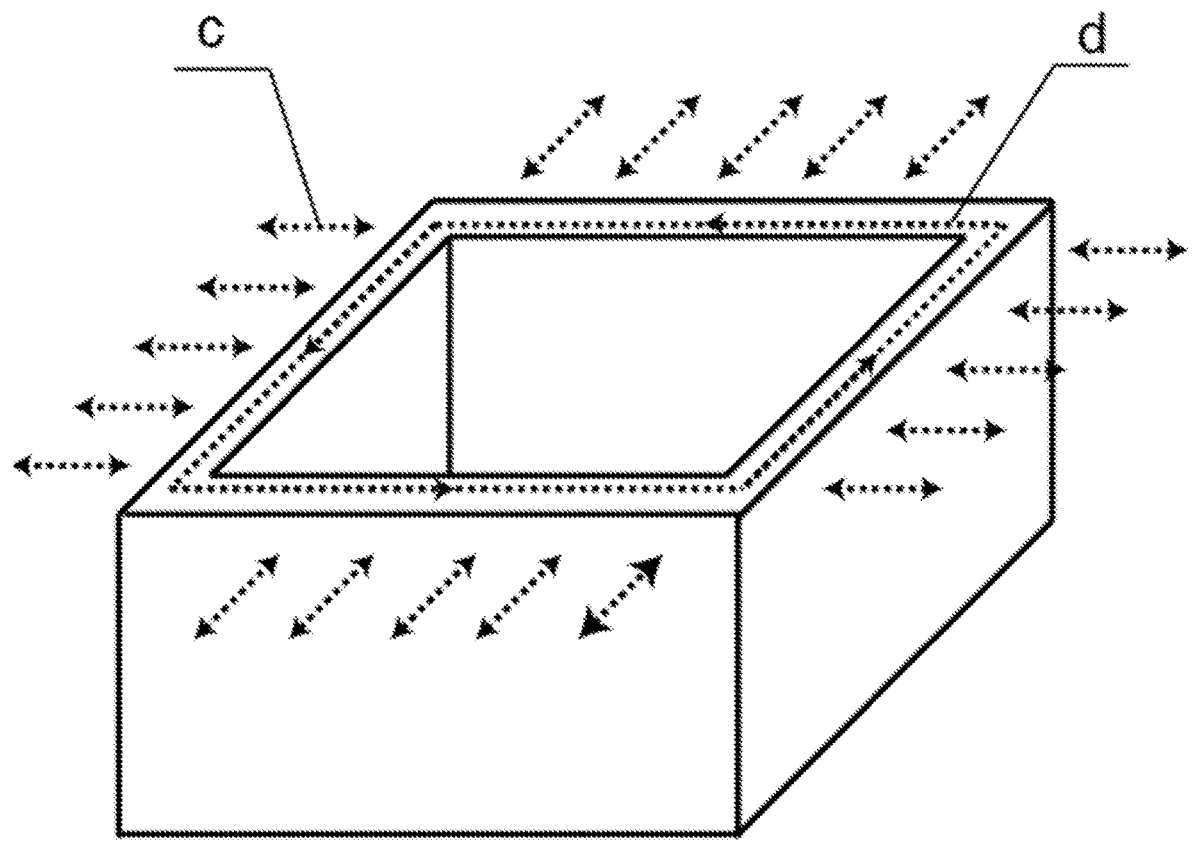
FIG. 12 is a schematic view of a structure of a typical large-size frame-shaped metal piece, where c is a normal direction of a frame (i.e., a vertical direction of the frame, from inside to outside or from outside to inside), and d is a circumferential direction of the frame (clockwise or counterclockwise).

When the metal piece and the forming cylinder 2 are both in a frame shape, the galvanometer array includes N (N≥2, preferably N≥4) galvanometer systems 4 arranged above a frame of the metal piece. All corresponding scanning areas of the galvanometer systems 4 entirely cover the upper surface of the forming cylinder 2, and through simultaneous operating of the galvanometer systems 4, simultaneous selective melting forming for the large-size ring-shaped metal piece with a plurality of laser beams is implemented. For instance, when the metal piece and the forming cylinder 2 are both in a square frame shape, as shown in FIG. 6, the galvanometer array includes four galvanometer systems 4, and the scanning area of each galvanometer system 4 is a quarter (i.e., one frame) of the upper surface of the forming cylinder 2. All scanning areas of the four galvanometer systems 4 exactly cover the entire upper surface of the forming cylinder 2, and through simultaneous operating of the four galvanometer systems 4, simultaneous selective melting forming for the metal piece with a plurality of laser beams is implemented. Alternatively, through movement of the galvanometer systems 4 in a circumferential direction of the frame, all scanning areas may cover the upper surface of the forming cylinder 2, and simultaneous selective melting forming for the metal piece with a plurality of laser beams is implemented. For instance, as shown in FIG. 10, the galvanometer array includes four galvanometer systems 4, and the scanning area of each galvanometer system 4 is one-eighth (i.e., half the frame) of the upper surface of the forming cylinder 2. Through movement of four galvanometer systems 4 across one-eighth (i.e., half the frame) of the upper surface of the forming cylinder 2 in a circumferential direction of the frame of the metal piece move, all scanning areas of the four galvanometer systems 4 cover the upper surface of the forming cylinder 2.

In the disclosure, each galvanometer system 4 may be connected to an external medium-power laser with a power of 500 W to 1 kW or a high-power laser with a power of 1 kW to 10 kW, and the beam diameter of each outputted laser beam 5 is controlled within the range of 0.1 mm to 10 mm. In this way, the forming efficiency may be significantly improved, and the foundation for the mass industrial production of various large-size ring-shaped and frame-shaped metal pieces is laid.

For the second part, during a laser powder bed fusion forming process, the interaction of laser beams and metal powders may form a large amount of smoke and dust. The smoke and dust are mainly composed of splashed droplets, powders, and burnt metal particles, and if the smoke and dust are not removed in time, they may be land on a metal powder bed, a part deposition layer, or an equipment cavity surface, and stability of the subsequent forming process may thus be affected. Since the disclosure specifically designs a set of forming device for the specific object of large-size ring-shaped and frame-shaped metal pieces, the forming device is a laser powder bed fusion forming device, and it also faces the problem of smoke and dusk pollution during the forming process. Therefore, research and design are required for this problem to obtain a corresponding solution. Although there are already some dust removal systems provided in the laser powder bed fusion equipment of the related art, it is difficult for these systems to be applied to large-size ring-shaped and frame-shaped metal pieces, and there is no technical problem of how to ensure effective removal of smoke and dust under the conditions of presence of ring-shaped and frame-shaped forming cylinders. Therefore, the dust removal system of the related art cannot be applied to the disclosure, and in the disclosure, a dust removal module suitable for large-size ring-shaped and frame-shaped metal pieces is redesigned and provided.

To be specific, when the metal piece and the forming cylinder are in a ring shape, as shown in FIG. 2, FIG. 3A, FIG. 3B, FIG. 4, and FIG. 5, the dust removal module is located between the forming cylinder 2 and the galvanometer array and is configured for forming a circulating air flow field which is distributed along a radial direction of the large-size ring-shaped metal piece or for forming segments a plurality of circulating air flow fields which are distributed in the circumferential direction of the large-size ring-shaped metal piece to accordingly achieve removal of smoke and dust.

Figure 3A:
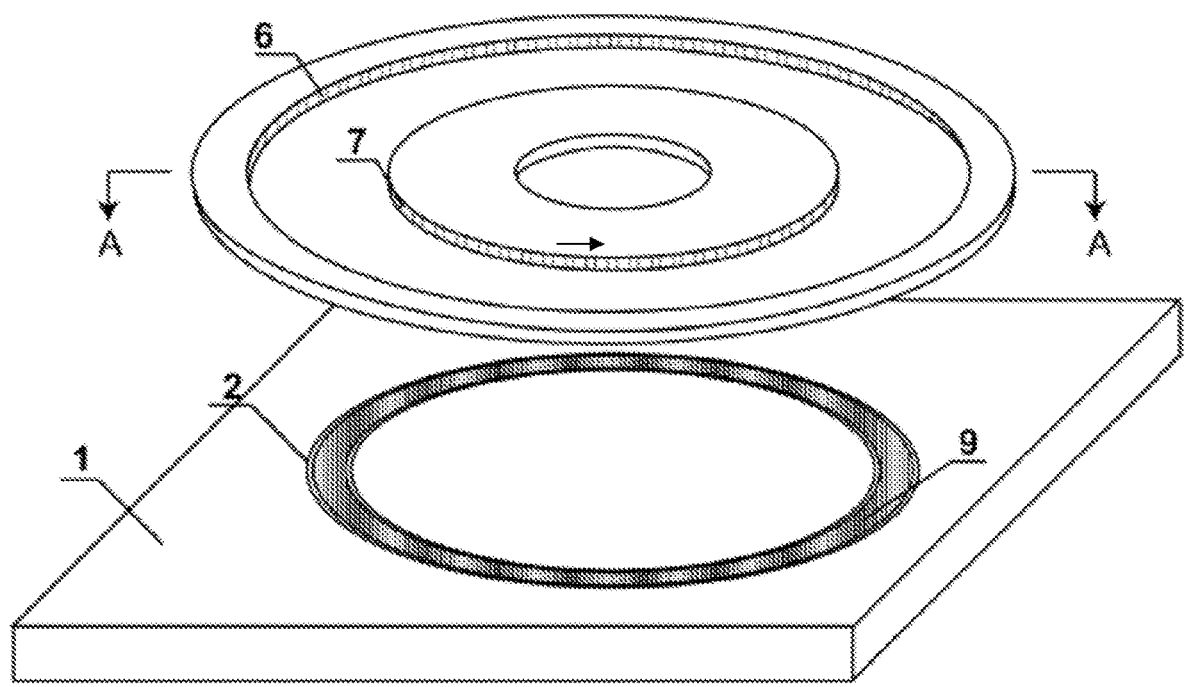
FIG. 3A and FIG. 3B are schematic views of a relative distance between partial key structures and a relative distance between the partial key structures and a metal piece deposition layer in the laser powder bed fusion forming device provided by embodiment 1 of the disclosure.
Figure 3B:
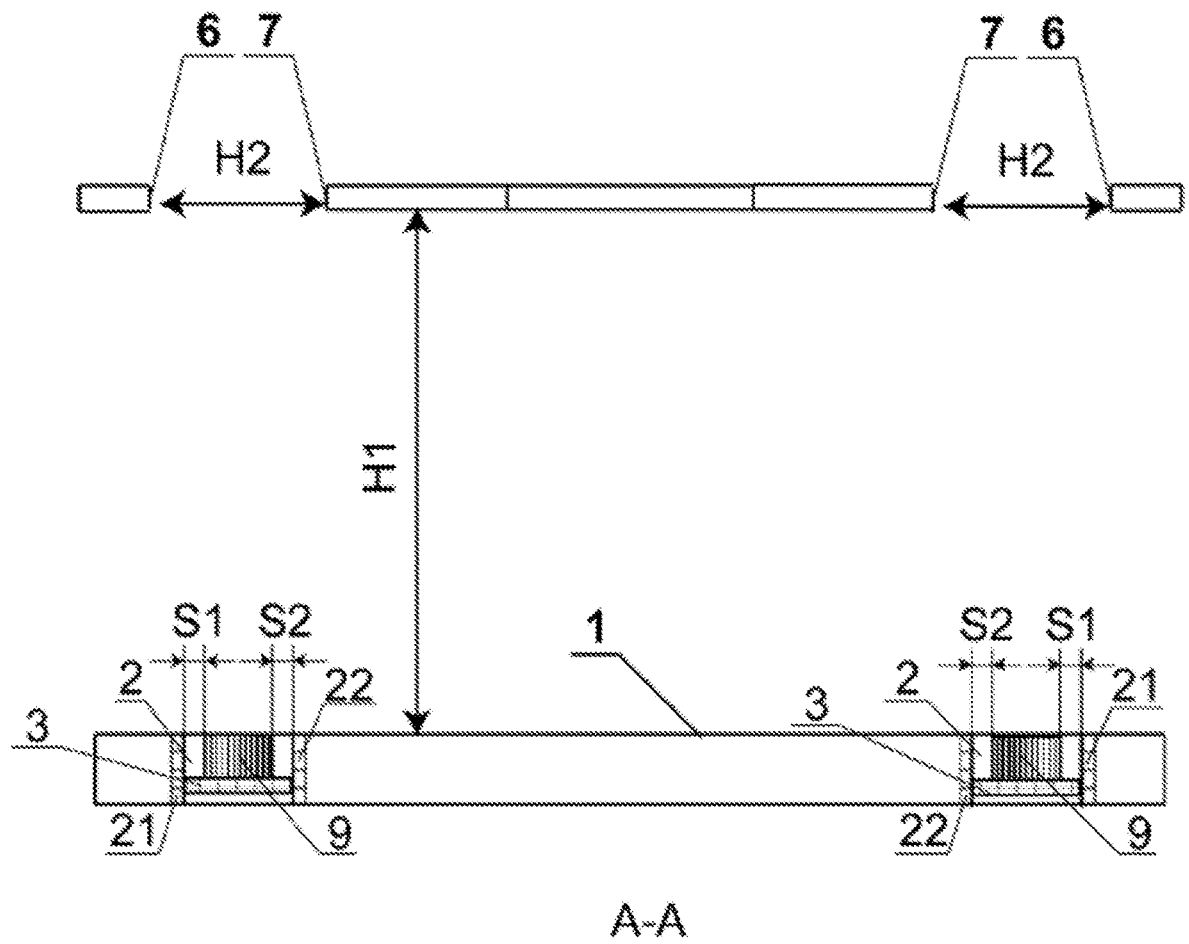
Figure 4:
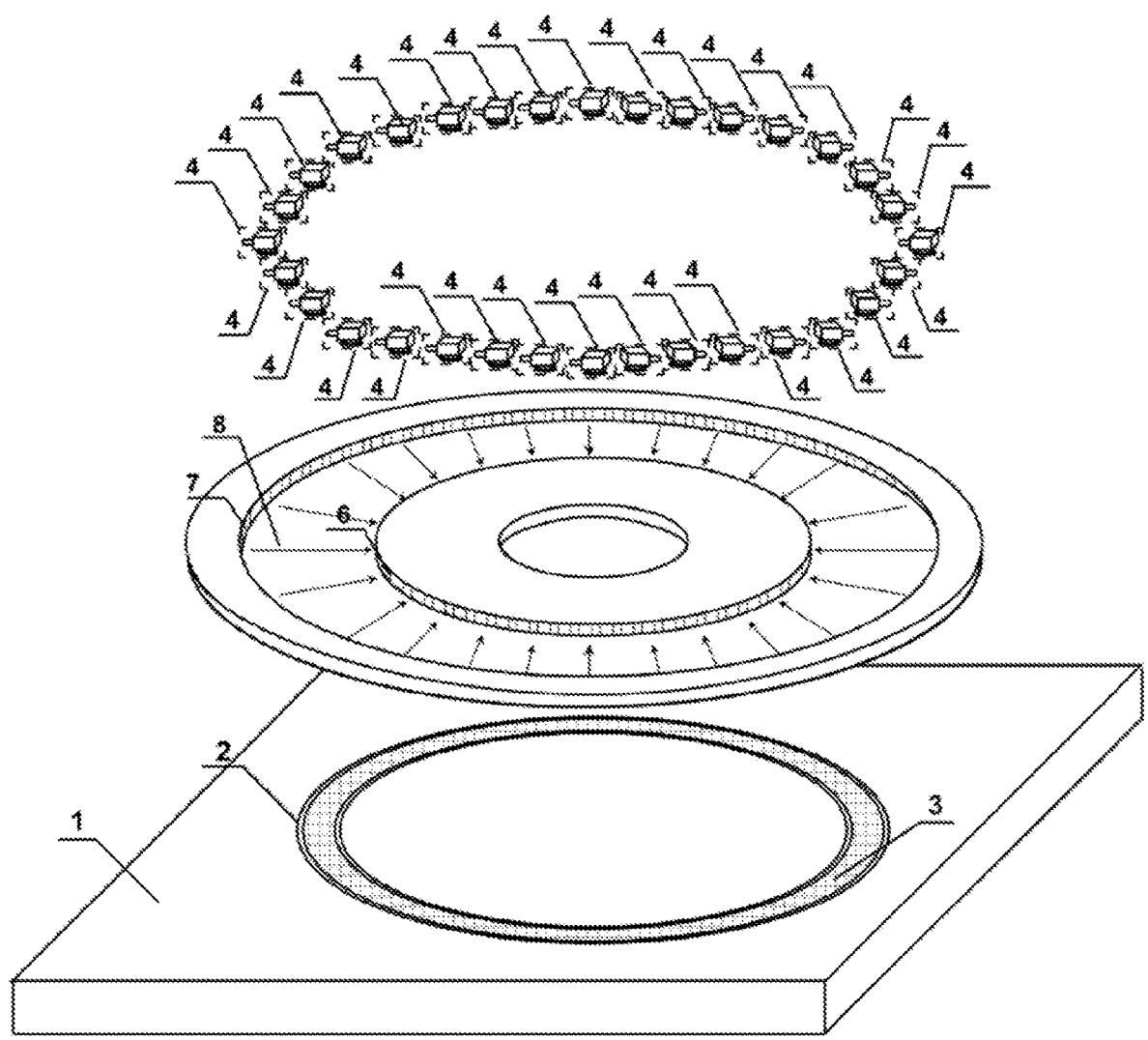
FIG. 4 is a schematic view of the structure of the laser powder bed fusion forming device for the large-size ring-shaped metal piece provided by embodiment 2 of the disclosure.

When all corresponding scanning areas of the galvanometer systems 4 entirely cover the upper surface of the forming cylinder 2, the galvanometer systems 4 at the moment may perform a single job at the same time to realize the laser scanning forming of a layer of metal powders. The galvanometer systems 4 do not need to be moved and just need to be fixed, and the correspondingly designed dust removal module should also not need to be moved. Based on the above, the following design is provided in the disclosure. As shown in FIG. 2, FIG. 3A and FIG. 3B, a set of dust removal module is designed, which includes an air suctioning mechanism and an air blowing mechanism. Herein, a shape of the air suctioning mechanism is adapted to an outer contour of the (ring-shaped) forming cylinder, the air suctioning mechanism is located above an outer side of the forming cylinder and is provided with a plurality of air suctioning openings 6 arranged in a ring shape. A shape of the air blowing mechanism is adapted to an inner contour of the (ring-shaped) forming cylinder, the air blowing mechanism is located above an inner side of the forming cylinder, is located on an inner side of the air suctioning mechanism, and is provided with air blowing openings 7 corresponding to the air suctioning openings 6. Through matching of the air suctioning openings 6 and the corresponding air blowing openings 7, a circulating air flow field 8 which is uniformly distributed in the radial direction of the large-size ring-shaped metal piece from inside to outside is formed above the forming cylinder. That is, the air suctioning mechanism is sleeved on the outside of the air blowing mechanism, a gap ring is provided between the two, and the ring acts as a formation space of the circulating air flow field 8. A smoke and dust purification host containing a circulating fan and a filter medium on the outside provides air circulating power for the air blowing mechanism and filters and removes the smoke and dust carried in the circulating air flow. To be specific, the clean air flow filtered by the smoke and dust purification host is sprayed out through the air blowing openings 7, and the smoke and dusk formed above the forming cylinder are sent to the smoke and dust purification host through the air suctioning openings 6 to achieve removal of the smoke and dust and circulation of the air flow. Alternatively, as shown in FIG. 4, a set of dust removal module is designed, which includes an air suctioning mechanism and an air blowing mechanism. Herein, a shape of the air suctioning mechanism is adapted to an inner contour of the (ring-shaped) forming cylinder, the air suctioning mechanism is located above an inner side of the forming cylinder and is provided with a plurality of air suctioning openings 6 arranged in a ring shape. A shape of the air blowing mechanism is adapted to an outer contour of the (ring-shaped) forming cylinder, the air blowing mechanism is located above an outer side of the forming cylinder, is located on an outer side of the air suctioning mechanism, and is provided with air blowing openings 7 corresponding to the air suctioning openings 6. Through matching of the air suctioning openings 6 and the corresponding air blowing openings 7, a circulating air flow field 8 which is uniformly distributed in the radial direction of the large-size ring-shaped metal piece from outside to inside is formed above the forming cylinder. That is, the air blowing mechanism is sleeved on the outside of the air suctioning mechanism, a gap ring is provided between the two, and the ring acts as a formation space of the circulating air flow field 8. A smoke and dust purification host containing a circulating fan and a filter medium on the outside provides air circulating power for the air blowing mechanism and filters and removes the smoke and dust carried in the circulating air flow. To be specific, the clean air flow filtered by the smoke and dust purification host is sprayed out through the air blowing openings 7, and the smoke and dusk formed above the forming cylinder are sent to the smoke and dust purification host through the air suctioning openings 6 to achieve removal of the smoke and dust and circulation of the air flow.

When all scanning areas cover the upper surface of the forming cylinder 2 through the movement of the galvanometer systems 4, the galvanometer systems 4 at this moment need to perform multiple tasks to complete the laser scanning forming of one metal powder layer. The galvanometer systems 4 need to move in the circumferential direction of the large-size ring-shaped metal piece. In order to ensure the dust removal effect and dust removal efficiency, the correspondingly-designed dust removal module should follow the movement of the galvanometer systems. Based on the above, the following design is provided in the disclosure. As shown in FIG. 5, a plurality of dust removal modules in a plurality of groups are designed, and the number of the dust removal modules is identical to the number of the galvanometer systems 4, that is, N groups (N≥2, preferably N≥4) are provided. Each group of the dust removal module is located under the corresponding galvanometer system 4 and moves synchronously with the galvanometer system 4. To be specific, the dust removal module includes an air suctioning mechanism and an air blowing mechanisms separately arranged on both sides of the galvanometer system 4. The air suctioning mechanism is provided with the air suctioning openings 6, and the air blowing mechanism is provided with the air blowing openings 7 corresponding to the air suctioning openings 6. Through matching of the N groups of air suctioning mechanisms and corresponding air blowing mechanisms, N segments of circulating air flow fields 8 which are distributed in the circumferential direction of the large-size ring-shaped metal piece are formed above the forming cylinder 2 and cover an entire surface of the forming cylinder 2 through moving synchronously with the N galvanometer systems 4.

When the metal piece and the forming cylinder are in a frame shape, as shown in FIG. 6, FIG. 7, FIG. 8, FIG. 9, and FIG. 10, the dust removal module is located between the forming cylinder 2 and the galvanometer array and is configured for forming a circulating air flow field which is distributed radially (i.e., a radial direction of a circumscribed circle of the outer contour of the frame-shaped forming cylinder or of an inscribed circle of the inner contour of the frame-shaped forming cylinder) along a circumscribed circle of a horizontal cross-section of the large-size frame-shaped metal piece, a circulating air flow field which is distributed along a normal direction of the frame of the large-size frame-shaped metal piece, or segments of a plurality of circulating air flow fields which are movably distributed in the circumferential direction of the frame of the large-size frame-shaped metal piece to accordingly achieve removal of smoke and dust.

When all corresponding scanning areas of the galvanometer systems 4 entirely cover the upper surface of the forming cylinder 2, the galvanometer systems 4 at the moment may perform a single job at the same time to realize the laser scanning forming of a layer of metal powders. The galvanometer systems 4 do not need to be moved and just need to be fixed, and the correspondingly designed dust removal module should also not need to be moved. Based on the above, the following design is provided in the disclosure. As shown in FIG. 6, the dust removal module is a group, which includes an air suctioning mechanism and an air blowing mechanism. Herein, the shape of the air suctioning mechanism is adapted to the circumscribed circle of the outer contour of the (ring-shaped) forming cylinder, the air suctioning mechanism is located above the outer side of the forming cylinder and is provided with the air suctioning openings 6 arranged in a ring shape. The shape of the air blowing mechanism is adapted to the inscribed circle of the inner contour of the (ring-shaped) forming cylinder, the air blowing mechanism is located above the inside side of the forming cylinder, is located on the inner side of the air suctioning mechanism, and is provided with the air blowing openings 7 corresponding to the air suctioning openings 6. Through matching of the air suctioning openings 6 and the corresponding air blowing openings 7, the circulating air flow field 8 which is uniformly distributed radially along the circumscribed circle of the horizontal cross-section of the large-size frame-shaped metal piece from inside to outside is formed above the forming cylinder. That is, the air suctioning mechanism is sleeved on the outside of the air blowing mechanism, a gap ring is provided between the two, and the ring acts as the formation space of the circulating air flow field 8. A smoke and dust purification host containing a circulating fan and a filter medium provides air circulating power for the air blowing mechanism and filters and removes the smoke and dust carried in the circulating air flow. To be specific, the clean air flow filtered by the smoke and dust purification host is sprayed out through the air blowing openings 7, and the smoke and dusk formed above the forming cylinder are sent to the smoke and dust purification host through the air suctioning openings 6 to achieve removal of the smoke and dust and circulation of the air flow.

Figure 7:
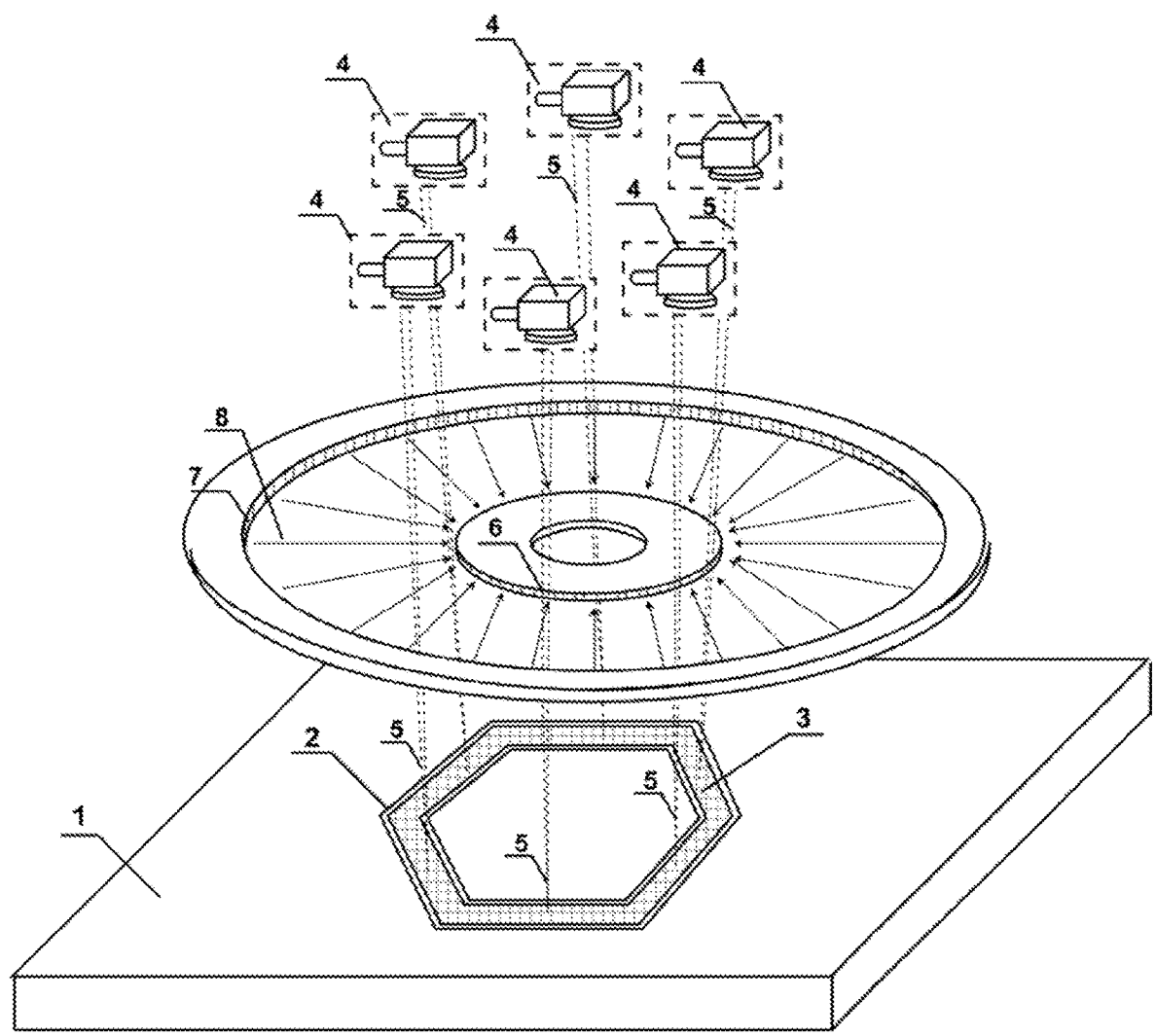
FIG. 7 is a schematic view of a structure of a laser powder bed fusion forming device for a large-size regular hexagonal frame-shaped metal piece provided by embodiment 5 of the disclosure.

Alternatively, as shown in FIG. 7, the dust removal module is a group, which includes an air suctioning mechanism and an air blowing mechanism. Herein, the shape of the air suctioning mechanism is adapted to the inscribed circle of the inner contour of the (ring-shaped) forming cylinder, the air suctioning mechanism is located above an inner side of the forming cylinder and is provided with the air suctioning openings 6 arranged in a ring shape. The shape of the air blowing mechanism is adapted to the circumscribed circle of the outer contour of the (ring-shaped) forming cylinder, the air blowing mechanism is located above the outer side of the forming cylinder, is located on the outer side of the air suctioning mechanism, and is provided with air blowing openings 7 corresponding to the air suctioning openings 6. Through matching of the air suctioning openings 6 and the corresponding air blowing openings 7, the circulating air flow field 8 which is uniformly distributed radially along the circumscribed circle of the horizontal cross-section of the large-size frame-shaped metal piece from outside to inside is formed above the forming cylinder. That is, the air blowing mechanism is sleeved on the outside of the air suctioning mechanism, a gap ring is provided between the two, and the ring acts as a formation space of the circulating air flow field 8. A smoke and dust purification host containing a circulating fan and a filter medium provides air circulating power for the air blowing mechanism and filters and removes the smoke and dust carried in the circulating air flow. To be specific, the clean air flow filtered by the smoke and dust purification host is sprayed out through the air blowing openings 7, and the smoke and dusk formed above the forming cylinder are sent to the smoke and dust purification host through the air suctioning openings 6 to achieve removal of the smoke and dust and circulation of the air flow.

Figure 8:
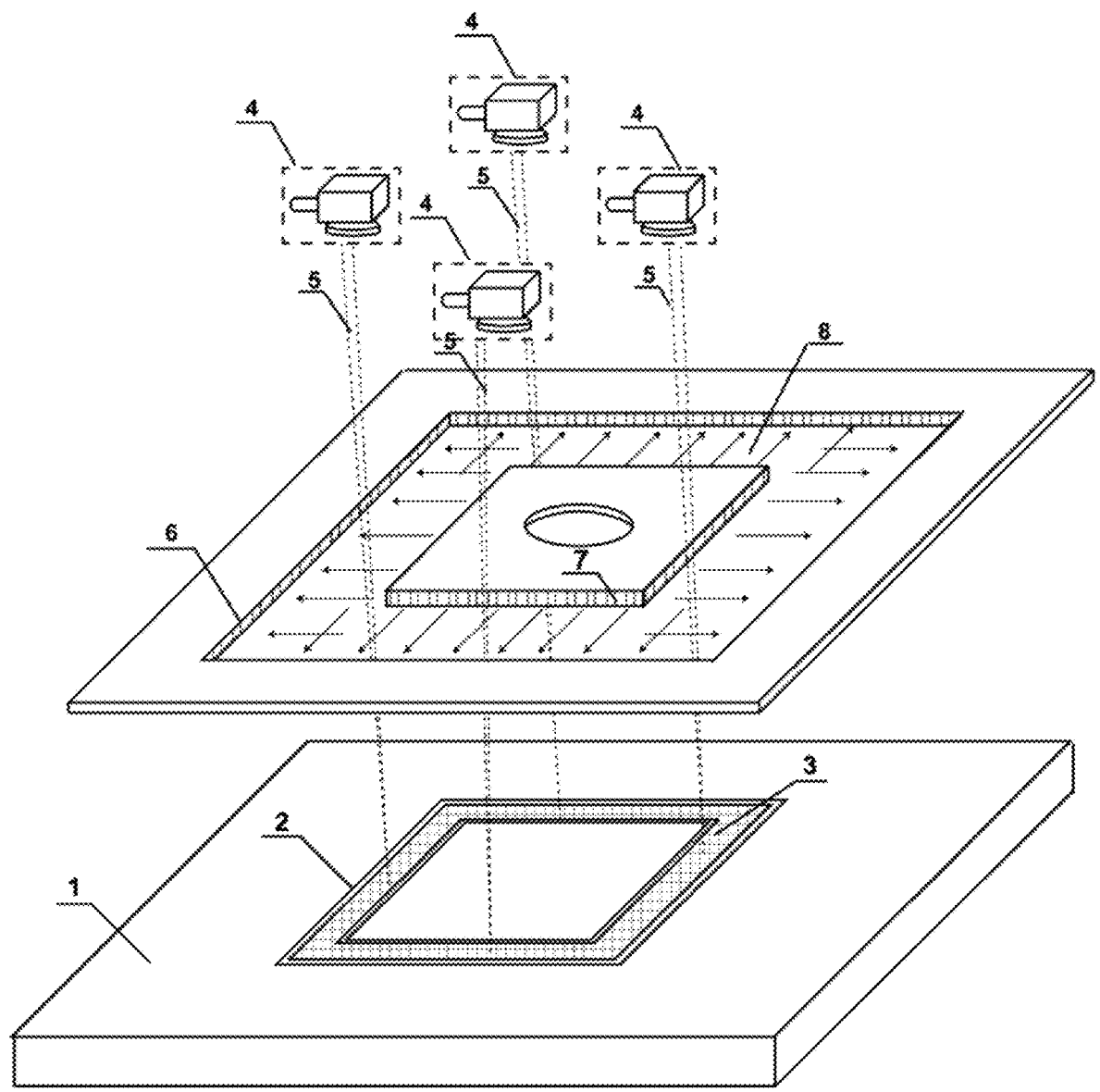
FIG. 8 is a schematic view of the structure of the laser powder bed fusion forming device for the large-size square frame-shaped metal piece provided by embodiment 6 of the disclosure.

Alternatively, as shown in FIG. 8, the dust removal module is a group, which includes an air suctioning mechanism and an air blowing mechanism. Herein, the shape of the air suctioning mechanism is adapted to the outer contour of the (frame-shaped) forming cylinder, the air suctioning mechanism is located above the outer side of the forming cylinder and is provided the air suctioning openings 6 parallel to the frame of the metal piece. The shape of the air blowing mechanism is adapted to the inner contour of the (frame-shaped) forming cylinder, the air blowing mechanism is located above the inner side of the forming cylinder, is located on the inner side of the air suctioning mechanism, and is provided with the air blowing openings 7 corresponding to the air suctioning openings 6. Through matching of the air suctioning openings 6 and the corresponding air blowing openings 7, the circulating air flow field 8 which is distributed in the normal direction of the frame of the large-size framed-shaped metal piece from inside to outside is formed above the forming cylinder. That is, the air suctioning mechanism is sleeved on the outside of the air blowing mechanism, a gap frame is provided between the two, and the gap acts as the formation space of the circulating air flow field 8. A smoke and dust purification host containing a circulating fan and a filter medium provides air circulating power for the air blowing mechanism and filters and removes the smoke and dust carried in the circulating air flow. To be specific, the clean air flow filtered by the smoke and dust purification host is sprayed out through the air blowing openings 7, and the smoke and dusk formed above the forming cylinder are sent to the smoke and dust purification host through the air suctioning openings 6 to achieve removal of the smoke and dust and circulation of the air flow.

Figure 9:
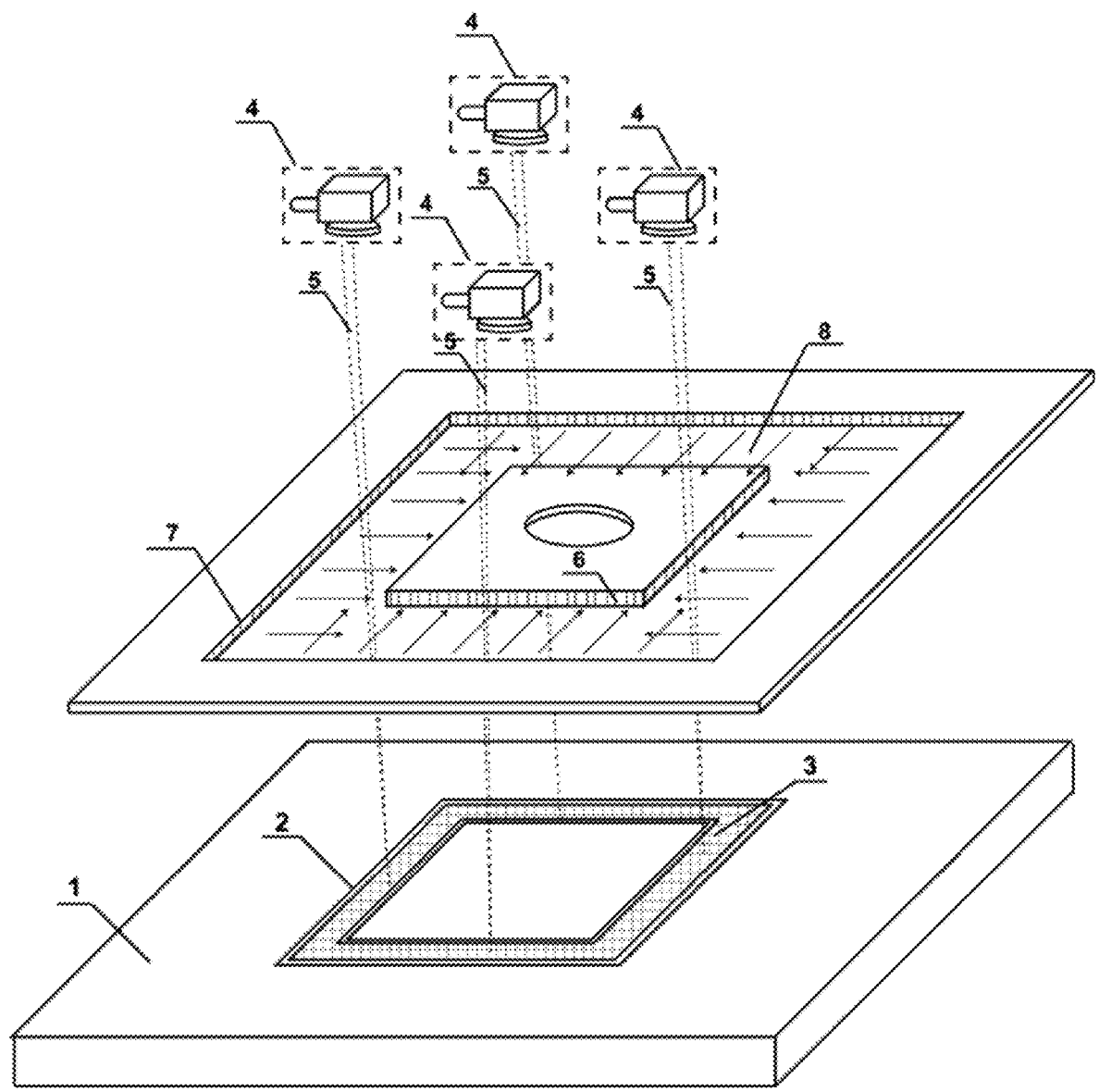
FIG. 9 is a schematic view of the structure of the laser powder bed fusion forming device for the large-size square frame-shaped metal piece provided by embodiment 7 of the disclosure.

Alternatively, as shown in FIG. 9, the dust removal module is a group, which includes an air suctioning mechanism and an air blowing mechanism. Herein, the shape of the air suctioning mechanism is adapted to the inner contour of the (frame-shaped) forming cylinder, the air suctioning mechanism is located above the inner side of the forming cylinder and is provided the air suctioning openings 6 parallel to the frame of the metal piece. The shape of the air blowing mechanism is adapted to the outer contour of the (frame-shaped) forming cylinder, the air blowing mechanism is located above the outer side of the forming cylinder, is located on the outer side of the air suctioning mechanism, and is provided with the air blowing openings 7 corresponding to the air suctioning openings 6. Through matching of the air suctioning openings 6 and the corresponding air blowing openings 7, the circulating air flow field 8 which is distributed in the normal direction of the frame of the large-size framed-shaped metal piece from outside to inside is formed above the forming cylinder. That is, the air blowing mechanism is sleeved on the outside of the air suctioning mechanism, a gap frame is provided between the two, and the frame acts as the formation space of the circulating air flow field 8. A smoke and dust purification host containing a circulating fan and a filter medium provides air circulating power for the air blowing mechanism and filters and removes the smoke and dust carried in the circulating air flow. To be specific, the clean air flow filtered by the smoke and dust purification host is sprayed out through the air blowing openings 7, and the smoke and dusk formed above the forming cylinder are sent to the smoke and dust purification host through the air suctioning openings 6 to achieve removal of the smoke and dust and circulation of the air flow.

When all scanning areas exactly cover the upper surface of the forming cylinder 2 through the movement of the galvanometer systems 4, the galvanometer systems 4 at this moment need to perform multiple tasks to complete the laser scanning forming of one metal powder layer. The galvanometer systems 4 need to move in the circumferential direction of the frame of the large-size frame-shaped metal piece. In order to ensure the dust removal effect and dust removal efficiency, the correspondingly-designed dust removal module should follow the movement of the galvanometer systems 4. Based on the above, the following design is provided in the disclosure. As shown in FIG. 10, a plurality of dust removal modules in a plurality of groups are designed, and the number of the dust removal modules is identical to the number of the galvanometer systems 4, that is, N groups (N≥2, preferably N≥4) are provided. Each group of the dust removal module is located under the corresponding galvanometer system 4 and moves synchronously with the galvanometer system 4. To be specific, the dust removal module includes an air suctioning mechanism and an air blowing mechanisms separately arranged on both sides of the galvanometer system 4. The air suctioning mechanism is provided with the air suctioning openings 6, and the air blowing mechanism is provided with the air blowing openings 7 corresponding to the air suctioning openings 6. Through matching of the N groups of air suctioning openings 6 and corresponding air blowing openings 6, N segments of circulating air flow fields 8 which are distributed in the circumferential direction of the frame of the large-size frame-shaped metal piece are formed above the forming cylinder 2 and cover the entire surface of the forming cylinder 2 through moving synchronously with the N galvanometer systems 4.

The smoke and dust are formed by the interaction of the laser beams and the metal powders, and the generated smoke and dust are mainly concentrated above the forming cylinder. Therefore, the arrangement position of the dust removal module is crucial, which directly determines the quality of the dust removal effect, and the distance between the air suctioning mechanism and the air blowing mechanism is the key to ensuring that a stable and uniform air flow may be generated above the metal powder layer. As such, in the disclosure, two key parameters, the distance between the dust removal module and the upper surface of the forming cylinder and the distance between the air suctioning openings 6 and the corresponding air blowing openings 7, are studied and designed. To be specific, as shown in FIG. 3A and FIG. 3B, a distance H1 between the dust removal module (specifically a lower surface of the dust removal module) and the upper surface of the forming cylinder 2 is designed to be 1 mm to 300 mm, preferably 5 mm to 100 mm, and a distance H2 between the air suctioning openings 6 and the corresponding air blowing openings 7 is 5 mm to 500 mm, preferably 200 mm to 400 mm. In order to further ensure the dust removal effect, in the disclosure, an air suctioning and blowing process of the dust removal module is also studied and designed. To be specific, an average flow velocity of the air flow fields formed between the air suctioning openings 6 and the corresponding air blowing openings 7 is designed to be 0.5 m/s to 5 m/s, preferably 1 m/s to 3 m/s. Under the abovementioned structural features and processes, the stability and uniformity of the circulating air flow may be ensured, such that the smoke and dust may be effectively eliminated, the metal powders may not be taken away together, and the forming quality is ensured.

In order to ensure the forming quality of the metal pieces and minimize a powder filling amount, in the disclosure, the parameters between the forming cylinder and the contours of the deposition layer are studied and designed. To be specific, during laser powder bed fusion forming, the forming cylinder outer wall is located outside the outer contour of the deposition layer of the large-size ring-shaped or frame-shaped metal piece, and a distance $S_1$ between an inner surface of the forming cylinder outer wall and the outer contour of the deposition layer of the large-size ring-shaped or frame-shaped metal piece is 0.1 mm to 150 mm, preferably 1 mm to 20 mm. The forming cylinder inner wall is located inside the inner contour of the deposition layer of the large-size ring-shaped or frame-shaped metal piece, and a distance $S_2$ between an inner surface of the forming cylinder inner wall and the inner contour of the deposition layer of the large-size ring-shaped or frame-shaped metal piece is 0.1 mm to 150 mm, preferably 1 mm to 20 mm. Under the above parameters, the effective forming of the metal piece may be ensured, and the surface quality of the metal piece is favorable without affecting the lifting accuracy of the forming cylinder. Besides, the forming device further includes a workbench 1, and the forming cylinder 2 is embedded in the workbench 1. To be specific, the forming cylinder 2 is arranged in a center of the workbench 1.

Specific embodiments of the disclosure are provided as follows.

Embodiment 1

As shown in FIG. 2, FIG. 3A and FIG. 3B, in this embodiment, a piece of laser powder bed fusion forming equipment for a large-size ring-shaped metal piece with an outer diameter of 1,000 mm and a wall thickness of 15 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both ring-shaped and are adapted to the outer and inner contours of the large-size ring-shaped metal piece. During laser powder bed fusion forming, the forming cylinder outer wall 21 is located outside the outer contour of the deposition layer of the large-size ring-shaped metal piece, and the distance $S_1$ from the outer contour of the deposition layer of the large-size ring-shaped metal piece is 5 mm. The forming cylinder inner wall 22 is located inside the inner contour of the deposition layer of the large-size ring-shaped metal piece, and the distance $S_2$ from the inner contour of the deposition layer of the large-size ring-shaped metal piece is 10 mm.

The galvanometer array is located above the workbench 1 and includes 8 galvanometer systems 4 fixedly arranged in a ring shape. Herein, all scanning areas corresponding to all of the galvanometer systems 4 exactly cover the upper surface of the forming cylinder 2, and simultaneous selective melting forming for the large-size ring-shaped metal piece with a plurality of laser beams 5 is thereby implemented. Each galvanometer system 4 is connected to an external medium-power laser with a power of 1 kW, and the beam diameter of each laser beam 5 outputted to the workbench 1 is controlled to be 0.15 mm.

The air blowing mechanism and the air suctioning mechanism in the dust removal module are respectively located above the inner and outer sides of the forming cylinder 2, and a distance H1 between them and the upper surface of the forming cylinder 2 is controlled to be 50 mm. The shape of the blowing mechanism is adapted to the inner contour of the forming cylinder 2, and the shape of the air suctioning mechanism is adapted to the outer contour of the forming cylinder 2. Through matching of the air suctioning openings 6 and the air blowing openings 7, the circulating air flow field 8 which is uniformly distributed in the radial direction of the large-size ring-shaped metal piece from inside to outside is formed above the forming cylinder 2. A projection of the circulating air flow field 8 on the upper surface (i.e., the workbench 1) of the forming cylinder 2 may cover the upper surface of the forming cylinder 2, and a distance H2 between the air suctioning openings 6 and the corresponding air blowing openings 7 is controlled to be 200 mm.

The forming process is provided as follows:

Step 1: A CAD model of the large-size ring-shaped metal piece is processed by using slicing software, and a laser scanning path of each metal deposition layer is generated. The dust removal module is turned on, and the circulating air flow field 8 which is uniformly distributed in the radial direction of the large-size ring-shaped metal piece from inside to outside is formed above the forming cylinder 2. The average flow velocity of the circulating air flow is set to 2 m/s.

Step 2: The height of the substrate 3 is adjusted, such that the upper surface thereof overlaps with the upper surface of the forming cylinder 2. The surface of the substrate 3 is coated with metal powders with a thickness of 0.06 mm by using a powder spreading device such as a scraper or a roller.

Step 3: 8 galvanometer systems 4 fixedly arranged in a ring shape perform simultaneous selective melting forming on a metal powder layer with a plurality of laser beams 5 according to a predetermined scanning path to form a first deposition layer of the metal piece. The specific laser scanning parameters are: laser power 1 kW, scanning speed 1,500 mm/s, scanning distance 0.1 mm, and beam diameter 0.15 mm.

Step 4: The substrate 3 is lowered to a same height as a thickness of the deposition layer, and a layer of metal powders with a thickness of 0.06 mm is coated on the deposition layer again.

Step 5: 8 galvanometer systems 4 fixedly arranged in a ring shape perform simultaneous selective melting forming on a metal powder layer with a plurality of laser beams 5 according to the predetermined scanning path to form a next deposition layer of the metal piece. The specific laser scanning parameters are: laser power 1 kW, scanning speed 1,500 mm/s, scanning distance 0.1 mm, and beam diameter 0.15 mm.

Step 6: Steps S4 to S5 are repeatedly performed until the laser powder bed fusion forming for the entire large-size ring-shaped metal piece is completed.

Embodiment 2

As shown in FIG. 4, in this embodiment, a piece of laser powder bed fusion forming equipment for a large-size ring-shaped metal piece with an outer diameter of 5,000 mm and a wall thickness of 10 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both ring-shaped and are adapted to the outer and inner contours of the large-size ring-shaped metal piece. During laser powder bed fusion forming, the forming cylinder outer wall is located outside the outer contour of the deposition layer of the large-size ring-shaped metal piece, and the distance $S_1$ from the outer contour of the deposition layer of the large-size ring-shaped metal piece is 10 mm. The forming cylinder inner wall is located inside the inner contour of the deposition layer of the large-size ring-shaped metal piece, and the distance $S_2$ from the inner contour of the deposition layer of the large-size ring-shaped metal piece is 15 mm.

The galvanometer array is located above the workbench 1 and includes 32 galvanometer systems 4 fixedly arranged in a ring shape. Herein, all corresponding scanning areas of all galvanometer systems 4 exactly cover the upper surface of the forming cylinder, and simultaneous selective melting forming for the large-size ring-shaped metal piece with a plurality of laser beams is thereby implemented. Each galvanometer system 4 is connected to an external high-power laser with a power of 3 kW, and the beam diameter of each laser beam 5 (to ensure the readability of FIG. 4, the laser beam 5 is not shown) outputted to the workbench 1 is controlled to be 0.5 mm.

The air suctioning mechanism and the air blowing mechanism in the dust removal module are respectively located above the inner and outer sides of the forming cylinder 2, and the distance H1 between them and the upper surface of the forming cylinder 2 is controlled to be 80 mm. The shape of the suctioning mechanism is adapted to the inner contour of the forming cylinder 2, and the shape of the air blowing mechanism is adapted to the outer contour of the forming cylinder 2. Through matching of the air suctioning openings 6 and the air blowing openings 7, the circulating air flow field 8 which is uniformly distributed in the radial direction of the large-size ring-shaped metal piece from outside to inside is formed above the forming cylinder 2. The projection of the circulating air flow field 8 on the upper surface (i.e., the workbench 1) of the forming cylinder 2 may cover the upper surface of the forming cylinder 2, and the distance H2 between the air suctioning openings 6 and the corresponding air blowing openings 7 is controlled to be 300 mm.

The forming process is provided as follows:

Step 1: The CAD model of the large-size ring-shaped metal piece is processed by using slicing software, and the laser scanning path of each metal deposition layer is generated. The dust removal module is turned on, and the circulating air flow field 8 which is uniformly distributed in the radial direction of the large-size ring-shaped metal piece from outside to inside is formed above the forming cylinder 2. The average flow velocity of the circulating air flow is set to 2.4 m/s.

Step 2: The height of the substrate 3 is adjusted, such that the upper surface thereof overlaps with the upper surface of the forming cylinder 2. The surface of the substrate 3 is coated with metal powders with a thickness of 0.2 mm by using a powder spreading device such as a scraper or a roller.

Step 3: 32 galvanometer systems 4 fixedly arranged in a ring shape perform simultaneous selective melting forming on a metal powder layer with a plurality of laser beams 5 according to the predetermined scanning path to form the first deposition layer of the metal piece. The specific laser scanning parameters are: laser power 3 kW, scanning speed 3,000 mm/s, scanning distance 0.2 mm, and beam diameter 0.5 mm.

Step 4: The substrate 3 is lowered to the same height as the thickness of the deposition layer, and a layer of metal powders with a thickness of 0.2 mm is coated on the deposition layer again.

Step 5: 32 galvanometer systems 4 fixedly arranged in a ring shape perform simultaneous selective melting forming on a metal powder layer with a plurality of laser beams 5 according to the predetermined scanning path to form the next deposition layer of the metal piece. The specific laser scanning parameters are: laser power 3 kW, scanning speed 3,000 mm/s, scanning distance 0.2 mm, and beam diameter 0.5 mm.

Step 6: Steps S4 to S5 are repeatedly performed until the laser powder bed fusion forming for the entire large-size ring-shaped metal piece is completed.

Embodiment 3

As shown in FIG. 5, in this embodiment, a piece of laser powder bed fusion forming equipment for a large-size ring-shaped metal piece with an outer diameter of 500 mm and a wall thickness of 14 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both ring-shaped and are adapted to the outer and inner contours of the large-size ring-shaped metal piece. During laser powder bed fusion forming, the forming cylinder outer wall is located outside the outer contour of the deposition layer of the large-size ring-shaped metal piece, and the distance from the outer contour of the deposition layer of the large-size ring-shaped metal piece is 3 mm. The forming cylinder inner wall is located inside the inner contour of the deposition layer of the large-size ring-shaped metal piece, and the distance from the inner contour of the deposition layer of the large-size ring-shaped metal piece is 4.5 mm.

The galvanometer array is located above the workbench 1 and includes 4 galvanometer systems 4 arranged in a ring shape. Herein, the galvanometer systems 4 need to move in the circumferential direction of the large-size ring-shaped metal piece, so as to achieve simultaneous selective melting forming for the large-size ring-shaped metal piece with a plurality of laser beams 5. Each galvanometer system 4 is connected to an external high-power laser with a power of 10 kW, and the beam diameter of each laser beam 5 outputted to the workbench 1 is controlled to be 8 mm.

The dust removal modules comprise 4 groups of air suctioning mechanisms and air blowing mechanisms. Herein, each group of air suctioning mechanism and air blowing mechanism is located at a distance of 60 mm from the upper surface of the forming cylinder 2 below the corresponding galvanometer system 4 and moves synchronously with the galvanometer system 4. The distance between the air suctioning openings 6 and the corresponding air blowing openings 7 is controlled to be 300 mm. The 4 groups of air suctioning mechanisms and corresponding air blowing mechanisms are matched with one another, and 4 segments of circulating air flow fields 8 are formed above the forming cylinder 2 and cover the entire upper surface of the forming cylinder 2 through moving synchronously with the 4 galvanometer systems.

The forming process is provided as follows:

Step 1: The CAD model of the large-size ring-shaped metal piece is processed by using slicing software, and the laser scanning path of each metal deposition layer is generated. The dust removal modules are turned on, and 4 segments of circulating air flow fields which are uniformly distributed in the circumferential direction of the large-size ring-shaped metal piece are formed above the forming cylinder 2. The average flow velocity of the circulating air flow is set to 2.8 m/s.

Step 2: The height of the substrate 3 is adjusted, such that the upper surface thereof overlaps with the upper surface of the forming cylinder 2. The surface of the substrate 3 is coated with metal powders with a thickness of 0.3 mm by using a powder spreading device such as a scraper or a roller.

Step 3: The 4 galvanometer systems 4 arranged in a ring shape perform simultaneous selective melting on the metal powder layer covered by a current scanning breadth with a plurality of laser beams 5 according to the predetermined scanning path. The specific laser scanning parameters are: laser power 10 kW, scanning speed 800 mm/s, scanning distance 5 mm, and beam diameter 8 mm. After scanning of a coverage range of the current scanning breadth is completed, the 4 galvanometer systems 4 arranged in a ring shape and the corresponding 4 groups of air suctioning mechanisms and air blowing mechanisms are moved in the circumferential direction of the large-size ring-shaped metal piece, and simultaneous selective melting is continuously performed on remaining metal powder layers with a plurality of laser beams 5 until formation of the first deposition layer of the metal piece is completed. The specific laser scanning parameters are: laser power 10 kW, scanning speed 800 mm/s, scanning distance 5 mm, and beam diameter 8 mm.

Step 4: The substrate 3 is lowered to the same height as the thickness of the deposition layer, and a layer of metal powders with a thickness of 0.3 mm is coated on the deposition layer again.

Step 5: The 4 galvanometer systems 4 arranged in a ring shape perform simultaneous selective melting on the metal powder layer covered by the current scanning breadth with a plurality of laser beams 5 according to the predetermined scanning path. The specific laser scanning parameters are: laser power 10 kW, scanning speed 800 mm/s, scanning distance 5 mm, and beam diameter 8 mm. After scanning of the coverage range of the current scanning breadth is completed, the 4 galvanometer systems 4 arranged in a ring shape and the corresponding 4 groups of air suctioning mechanisms and air blowing mechanisms are moved in the circumferential direction of the large-size ring-shaped metal piece, and simultaneous selective melting is continuously performed on the remaining metal powder layers with a plurality of laser beams until formation of the next deposition layer of the metal piece is completed. The specific laser scanning parameters are: laser power 10 kW, scanning speed 800 mm/s, scanning distance 5 mm, and beam diameter 8 mm.

Step 6: Steps S4 to S5 are repeatedly performed until the laser powder bed fusion forming for the entire large-size ring-shaped metal piece is completed.

Embodiment 4

As shown in FIG. 6, in this embodiment, a piece of laser powder bed fusion forming equipment for a large-size square frame-shaped metal piece with a frame length of 250 mm and a wall thickness of 8 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both square frame-shaped and are adapted to outer and inner contours of the large-size square frame-shaped metal piece. During laser powder bed fusion forming, the forming cylinder outer wall is located outside the outer contour of the metal piece deposition layer, and the distance from the outer contour of the metal piece deposition layer is 13 mm. The forming cylinder inner wall is located inside the inner contour of the metal piece deposition layer, and the distance from the inner contour of the metal piece deposition layer is 16 mm.

The galvanometer array is located above the workbench 1 and includes 4 galvanometer systems 4 uniformly and fixedly arranged along a square frame. Herein, all corresponding scanning areas of all galvanometer systems 4 exactly cover the upper surface of the forming cylinder 2, and simultaneous selective melting forming for the large-size square frame-shaped metal piece with a plurality of laser beams 5 is thereby implemented. Each galvanometer system 4 is connected to an external medium-power laser with a power of 1 kW, and the beam diameter of each laser beam 5 outputted to the workbench 1 is controlled to be 0.2 mm.

The air blowing mechanism and the air suctioning mechanism in the dust removal module are respectively located above the inner and outer sides of the forming cylinder 2, and the distance between them and the upper surface of the forming cylinder 2 is controlled to be 40 mm. The shape of the blowing mechanism is adapted to the inscribed circle of the inner contour of the forming cylinder 2, and the shape of the air suctioning mechanism is adapted to the circumscribed circle of the outer contour of the forming cylinder 2. Through matching of the air suctioning openings 6 and the corresponding air blowing openings 7, the circulating air flow field 8 which is uniformly distributed radially along a circumscribed circle of a horizontal cross-section of the large-size square frame-shaped metal piece from inside to outside is formed above the forming cylinder 2. The projection of the circulating air flow field 8 on the upper surface (i.e., the workbench 1) of the forming cylinder 2 may cover the upper surface of the forming cylinder 2, and the distance between the air suctioning openings 6 and the corresponding air blowing openings 7 is controlled to be 280 mm.

The forming process is provided as follows:

Step 1: A CAD model of the large-size square frame-shaped metal piece is processed by using slicing software, and the laser scanning path of each metal deposition layer is generated. The dust removal module is turned on, and the circulating air flow field 8 which is uniformly distributed radially along the circumscribed circle of the horizontal cross-section of the large-size square frame-shaped metal piece from inside to outside is formed above the forming cylinder 2. The average flow velocity of the circulating air flow is set to 1.5 m/s.

Step 2: The height of the substrate 3 is adjusted, such that the upper surface thereof overlaps with the upper surface of the forming cylinder 2. The surface of the substrate 3 is coated with metal powders with a thickness of 0.04 mm by using a powder spreading device such as a scraper or a roller.

Step 3: 4 galvanometer systems 4 which are fixedly arranged perform simultaneous selective melting forming on a metal powder layer with a plurality of laser beams 5 according to the predetermined scanning path to form the first deposition layer of the metal piece. The specific laser scanning parameters are: laser power 1 kW, scanning speed 700 mm/s, scanning distance 0.06 mm, and beam diameter 0.2 mm.

Step 4: The substrate 3 is lowered to the same height as the thickness of the deposition layer, and a layer of metal powders with a thickness of 0.04 mm is coated on the deposition layer again.

Step 5: 4 galvanometer systems 4 which are fixedly arranged perform simultaneous selective melting forming on a metal powder layer with a plurality of laser beams 5 according to the predetermined scanning path to form the next deposition layer of the metal piece. The specific laser scanning parameters are: laser power 1 kW, scanning speed 700 mm/s, scanning distance 0.06 mm, and beam diameter 0.2 mm.

Step 6: Steps S4 to S5 are repeatedly performed until the laser powder bed fusion forming for the entire large-size square frame-shaped metal piece is completed.

Embodiment 5

As shown in FIG. 7, in this embodiment, a piece of laser powder bed fusion forming equipment for a large-size regular hexagonal frame-shaped metal piece with a frame length of 400 mm and a wall thickness of 10 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both regular hexagonal frame-shaped and are adapted to outer and inner contours of the large-size regular hexagonal frame-shaped metal piece. During laser powder bed fusion forming, the forming cylinder outer wall is located outside the outer contour of the metal piece deposition layer, and the distance from the outer contour of the metal piece deposition layer is 8 mm. The forming cylinder inner wall is located inside the inner contour of the metal piece deposition layer, and the distance from the inner contour of the metal piece deposition layer is 4 mm.

The galvanometer array is located above the workbench and includes 6 galvanometer systems 4 uniformly and fixedly arranged along a regular hexagonal frame. Herein, all corresponding scanning areas of all galvanometer systems 4 exactly cover the upper surface of the forming cylinder 2, and simultaneous selective melting forming for the large-size regular hexagonal frame-shaped metal piece with a plurality of laser beams 5 is thereby implemented. Each galvanometer system 4 is connected to an external high-power laser with a power of 5 kW, and the beam diameter of each laser beam 5 outputted to the workbench 1 is controlled to be 0.8 mm.

The air suctioning mechanism and the air blowing mechanism in the dust removal module are respectively located above the inner and outer sides of the forming cylinder 2, and the distance between them and the upper surface of the forming cylinder 2 is controlled to be 85 mm. The shape of the suctioning mechanism is adapted to the inscribed circle of the inner contour of the forming cylinder 2, and the shape of the air blowing mechanism is adapted to the circumscribed circle of the outer contour of the forming cylinder 2. Through matching of the air suctioning openings 6 and the corresponding air blowing openings 7, the circulating air flow field 8 which is uniformly distributed radially along a circumscribed circle of a horizontal cross-section of the large-size regular hexagonal frame-shaped metal piece from outside to inside is formed above the forming cylinder 2. The projection of the circulating air flow field 8 on the upper surface (i.e., the workbench 1) of the forming cylinder 2 may cover the upper surface of the forming cylinder 2, and the distance between the air suctioning openings 6 and the corresponding air blowing openings 7 is controlled to be 360 mm.

The forming process is provided as follows:

Step 1: A CAD model of the large-size regular hexagonal frame-shaped metal piece is processed by using slicing software, and the laser scanning path of each metal deposition layer is generated. The dust removal module is turned on, and the circulating air flow field 8 which is uniformly distributed radially along the circumscribed circle of the horizontal cross-section of the large-size square frame-shaped metal piece from outside to inside is formed above the forming cylinder. The average flow velocity of the circulating air flow is set to 2.5 m/s.

Step 2: The height of the substrate 3 is adjusted, such that the upper surface thereof overlaps with the upper surface of the forming cylinder 2. The surface of the substrate 3 is coated with metal powders with a thickness of 0.25 mm by using a powder spreading device such as a scraper or a roller.

Step 3: 6 galvanometer systems 4 which are fixedly arranged perform simultaneous selective melting forming on a metal powder layer with a plurality of laser beams 5 according to the predetermined scanning path to form the first deposition layer of the metal piece. The specific laser scanning parameters are: laser power 5 kW, scanning speed 2,500 mm/s, scanning distance 0.15 mm, and beam diameter 0.8 mm.

Step 4: The substrate 3 is lowered to the same height as the thickness of the deposition layer, and a layer of metal powders with a thickness of 0.25 mm is coated on the deposition layer again.

Step 5: 6 galvanometer systems 4 which are fixedly arranged perform simultaneous selective melting forming on a metal powder layer with a plurality of laser beams 5 according to the predetermined scanning path to form the next deposition layer of the metal piece. The specific laser scanning parameters are: laser power 5 kW, scanning speed 2,500 mm/s, scanning distance 0.15 mm, and beam diameter 0.8 mm.

Step 6: Steps S4 to S5 are repeatedly performed until the laser powder bed fusion forming for the entire large-size regular hexagonal frame-shaped metal piece is completed.

Embodiment 6

As shown in FIG. 8, in this embodiment, a piece of laser powder bed fusion forming equipment for a large-size square frame-shaped metal piece with a frame length of 400 mm and a wall thickness of 20 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both square frame-shaped and are adapted to outer and inner contours of the large-size square frame-shaped metal piece. During laser powder bed fusion forming, the forming cylinder outer wall is located outside the outer contour of the metal piece deposition layer, and the distance from the outer contour of the metal piece deposition layer is 5 mm. The forming cylinder inner wall is located inside the inner contour of the metal piece deposition layer, and the distance from the inner contour of the metal piece deposition layer is 5 mm.

The galvanometer array is located above the workbench 1 and includes 4 galvanometer systems 4 uniformly and fixedly arranged along a square frame. Herein, all corresponding scanning areas of all galvanometer systems 4 exactly cover the upper surface of the forming cylinder 2, and simultaneous selective melting forming for the large-size square frame-shaped metal piece with a plurality of laser beams 5 is thereby implemented. Each galvanometer system 4 is connected to an external high-power laser with a power of 3.5 kW, and the beam diameter of each laser beam 5 outputted to the workbench 1 is controlled to be 0.4 mm.

The air blowing mechanism and the air suctioning mechanism in the dust removal module are respectively located above the inner and outer sides of the forming cylinder 2, and the distance between them and the upper surface of the forming cylinder 2 is controlled to be 75 mm. The shape of the suctioning mechanism is adapted to the outer contour of the forming cylinder 2, and the shape of the air blowing mechanism is adapted to the inner contour of the forming cylinder 2. Through matching of the air suctioning openings 6 and the corresponding air blowing openings 7, the circulating air flow field 8 which is distributed in the normal direction of the frame of the large-size square frame-shaped metal piece from inside to outside is formed above the forming cylinder 2. The projection of the circulating air flow field 8 on the upper surface (i.e., the workbench 1) of the forming cylinder 2 may cover the upper surface of the forming cylinder 2, and the distance between the air suctioning openings 6 and the corresponding air blowing openings 7 is controlled to be 380 mm.

The forming process is provided as follows:

Step 1: A CAD model of the large-size square frame-shaped metal piece is processed by using slicing software, and the laser scanning path of each metal deposition layer is generated. The dust removal module is turned on, and the circulating air flow field 8 which is uniformly distributed in the normal direction of the frame of the large-size square frame-shaped metal piece from inside to outside is formed above the forming cylinder 2. The average flow velocity of the circulating air flow is set to 2.9 m/s.

Step 2: The height of the substrate 3 is adjusted, such that the upper surface thereof overlaps with the upper surface of the forming cylinder 2. The surface of the substrate 3 is coated with metal powders with a thickness of 0.35 mm by using a powder spreading device such as a scraper or a roller.

Step 3: 4 galvanometer systems 4 which are fixedly arranged perform simultaneous selective melting forming on a metal powder layer with a plurality of laser beams 5 according to the predetermined scanning path to form the first deposition layer of the metal piece. The specific laser scanning parameters are: laser power 3.5 kW, scanning speed 3,500 mm/s, scanning distance 0.2 mm, and beam diameter 0.4 mm.

Step 4: The substrate 3 is lowered to the same height as the thickness of the deposition layer, and a layer of metal powders with a thickness of 0.35 mm is coated on the deposition layer again.

Step 5: 4 galvanometer systems 4 which are fixedly arranged perform simultaneous selective melting forming on a metal powder layer with a plurality of laser beams 5 according to the predetermined scanning path to form the next deposition layer of the metal piece. The specific laser scanning parameters are: laser power 3.5 kW, scanning speed 3,500 mm/s, scanning distance 0.2 mm, and beam diameter 0.4 mm.

Step 6: Steps S4 to S5 are repeatedly performed until the laser powder bed fusion forming for the entire large-size square frame-shaped metal piece is completed.

Embodiment 7

As shown in FIG. 9, in this embodiment, a piece of laser powder bed fusion forming equipment for a large-size square frame-shaped metal piece with a frame length of 350 mm and a wall thickness of 15 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both square frame-shaped and are adapted to outer and inner contours of the large-size square frame-shaped metal piece. During laser powder bed fusion forming, the forming cylinder outer wall is located outside the outer contour of the metal piece deposition layer, and the distance from the outer contour of the metal piece deposition layer is 20 mm. The forming cylinder inner wall is located inside the inner contour of the metal piece deposition layer, and the distance from the inner contour of the metal piece deposition layer is 20 mm.

The galvanometer array is located above the workbench 1 and includes 4 galvanometer systems 4 uniformly and fixedly arranged along a square frame. Herein, all corresponding scanning areas of all galvanometer systems 4 exactly cover the upper surface of the forming cylinder 2, and simultaneous selective melting forming for the large-size square frame-shaped metal piece with a plurality of laser beams 5 is thereby implemented. Each galvanometer system 4 is connected to an external high-power laser with a power of 6 kW, and the beam diameter of each laser beam 5 outputted to the workbench 1 is controlled to be 1 mm.

The air suctioning mechanism and the air blowing mechanism in the dust removal module are respectively located above the inner and outer sides of the forming cylinder 2, and the distance between them and the upper surface of the forming cylinder 2 is controlled to be 65 mm. The shape of the suctioning mechanism is adapted to the inner contour of the forming cylinder 2, and the shape of the air blowing mechanism is adapted to the outer contour of the forming cylinder 2. Through matching of the air suctioning openings 6 and the corresponding air blowing openings 7, the circulating air flow field 8 which is distributed in the normal direction of the frame of the large-size square frame-shaped metal piece from outside to inside is formed above the forming cylinder 2. The projection of the circulating air flow field 8 on the upper surface (i.e., the workbench 1) of the forming cylinder 2 may cover the upper surface of the forming cylinder 2, and the distance between the air suctioning openings 6 and the corresponding air blowing openings 7 is controlled to be 250 mm.

The forming process is provided as follows:

Step 1: A CAD model of the large-size square frame-shaped metal piece is processed by using slicing software, and the laser scanning path of each metal deposition layer is generated. The dust removal module is turned on, and the circulating air flow field 8 which is uniformly distributed in the normal direction of the frame of the large-size square frame-shaped metal piece from outside to inside is formed above the forming cylinder. The average flow velocity of the circulating air flow is set to 1.8 m/s.

Step 2: The height of the substrate 3 is adjusted, such that the upper surface thereof overlaps with the upper surface of the forming cylinder 2. The surface of the substrate 3 is coated with metal powders with a thickness of 0.2 mm by using a powder spreading device such as a scraper or a roller.

Step 3: 4 galvanometer systems 4 which are fixedly arranged perform simultaneous selective melting forming on a metal powder layer with a plurality of laser beams 5 according to the predetermined scanning path to form the first deposition layer of the metal piece. The specific laser scanning parameters are: laser power 6 kW, scanning speed 2,000 mm/s, scanning distance 0.5 mm, and beam diameter 1 mm.

Step 4: The substrate 3 is lowered to the same height as the thickness of the deposition layer, and a layer of metal powders with a thickness of 0.2 mm is coated on the deposition layer again.

Step 5: 4 galvanometer systems 4 which are fixedly arranged perform simultaneous selective melting forming on a metal powder layer with a plurality of laser beams 5 according to the predetermined scanning path to form the next deposition layer of the metal piece. The specific laser scanning parameters are: laser power 6 kW, scanning speed 2,000 mm/s, scanning distance 0.5 mm, and beam diameter 1 mm.

Step 6: Steps S4 to S5 are repeatedly performed until the laser powder bed fusion forming for the entire large-size square frame-shaped metal piece is completed.

Embodiment 8

As shown in FIG. 10, in this embodiment, a piece of laser powder bed fusion forming equipment for a large-size square frame-shaped metal piece with a frame length of 800 mm and a wall thickness of 10 mm is provided, which includes the workbench 1, the forming cylinder 2, the substrate 3, the galvanometer array, and the dust removal module, where:

The forming cylinder 2 and the substrate 3 are located in the center of the workbench 1, and the shapes of the two are both square frame-shaped and are adapted to outer and inner contours of the large-size square frame-shaped metal piece. During laser powder bed fusion forming, the forming cylinder outer wall is located outside the outer contour of the metal piece deposition layer, and the distance from the outer contour of the metal piece deposition layer is 2 mm. The forming cylinder inner wall is located inside the inner contour of the metal piece deposition layer, and the distance from the inner contour of the metal piece deposition layer is 2.5 mm.

The galvanometer array is located above the workbench and includes 4 galvanometer systems 4 distributed along a square frame. Herein, the galvanometer systems 4 need to move in the circumferential direction of the square frame, so as to achieve simultaneous selective melting forming for the large-size square frame-shaped metal piece with a plurality of laser beams 5. Each galvanometer system 4 is connected to an external high-power laser with a power of 3 kW, and the beam diameter of each laser beam 5 outputted to the workbench 1 is controlled to be 0.5 mm.

The dust removal modules include 4 groups of air suctioning mechanisms and air blowing mechanisms. Herein, each group of air suctioning mechanism and air blowing mechanism is located at a distance of 30 mm from the upper surface of the forming cylinder 2 below the corresponding galvanometer system 4 and moves synchronously with the galvanometer system 4. The distance between the air suctioning openings 6 and the corresponding air blowing openings 7 is controlled to be 225 mm. The 4 groups of air suctioning mechanisms and corresponding air blowing mechanisms are matched with one another, and 4 segments of circulating air flow fields 8 are formed above the forming cylinder 2 and cover the entire upper surface of the forming cylinder 2 through moving synchronously with the 4 galvanometer systems 4.

The forming process is provided as follows:

Step 1: A CAD model of the large-size square frame-shaped metal piece is processed by using slicing software, and the laser scanning path of each metal deposition layer is generated. The dust removal modules are turned on, and 4 segments of circulating air flow fields which are uniformly distributed in the circumferential direction of frame of the large-size square frame-shaped metal piece are formed above the forming cylinder 2. The average flow velocity of the circulating air flow is set to 3 m/s.

Step 2: The height of the substrate 3 is adjusted, such that the upper surface thereof overlaps with the upper surface of the forming cylinder 2. The surface of the substrate 3 is coated with metal powders with a thickness of 0.15 mm by using a powder spreading device such as a scraper or a roller.

Step 3: The 4 galvanometer systems 4 distributed along the square frame perform simultaneous selective melting on the metal powder layer covered by the current scanning breadth with a plurality of laser beams 5 according to the predetermined scanning path. The specific laser scanning parameters are: laser power 3 kW, scanning speed 3,000 mm/s, scanning distance 0.2 mm, and beam diameter 0.5 mm. After scanning of the coverage range of the current scanning breadth is completed, the 4 galvanometer systems 4 distributed along the square frame and the corresponding 4 groups of air suctioning mechanisms and air blowing mechanisms are moved in the circumferential direction of the frame of the metal piece, and simultaneous selective melting is continuously performed on the remaining metal powder layers with a plurality of laser beams 5 until formation of the first deposition layer of the metal piece is completed. The specific laser scanning parameters are: laser power 3 kW, scanning speed 3,000 mm/s, scanning distance 0.2 mm, and beam diameter 0.5 mm.

Step 4: The substrate 3 is lowered to the same height as the thickness of the deposition layer, and a layer of metal powders with a thickness of 0.15 mm is coated on the deposition layer again.

Step 5: The 4 galvanometer systems 4 distributed along the square frame perform simultaneous selective melting on the metal powder layer covered by the current scanning breadth with a plurality of laser beams 5 according to the predetermined scanning path. The specific laser scanning parameters are: laser power 3 kW, scanning speed 3,000 mm/s, scanning distance 0.2 mm, and beam diameter 0.5 mm. After scanning of the coverage range of the current scanning breadth is completed, the 4 galvanometer systems distributed along the square frame and the corresponding 4 groups of air suctioning mechanisms and air blowing mechanisms are moved in the circumferential direction of the frame of the metal piece, and simultaneous selective melting is continuously performed on the remaining metal powder layers with a plurality of laser beams 5 until formation of the next deposition layer of the metal piece is completed. The specific laser scanning parameters are: laser power 3 kW, scanning speed 3,000 mm/s, scanning distance 0.2 mm, and beam diameter 0.5 mm.

Step 6: Steps S4 to S5 are repeatedly performed until the laser powder bed fusion forming for the entire large-size square frame-shaped metal piece is completed.

In the disclosure, the forming cylinder and the substrate are both ring-shaped or frame-shaped, and the inner and outer contours of the two are respectively adapted to the inner and outer contours of the large-size ring-shaped or frame-shaped metal piece, and in this way, the amount of redundant powder filling may thus be significantly reduced. Regarding the large-size ring-shaped metal piece, in the dust removal system, the circulating air flow field uniformly distributed in the radial direction of the ring-shaped metal piece and covering the forming cylinder or segments of circulating air flow fields movably and uniformly distributed in the circumferential direction of the ring-shaped metal piece and covering the forming cylinder are formed above the forming cylinder. Regarding the large-size frame-shaped metal piece, in the dust removal system, the circulating air flow field uniformly distributed radially along the circumscribed circle of the horizontal cross-section of the metal piece and covering the forming cylinder, the circulating air flow field distributed uniformly in the normal direction of the frame of the metal piece and covering the forming cylinder, or segments of circulating air flow fields movably and uniformly distributed in the circumferential direction of the frame of the metal piece and covering the forming cylinder are formed above the forming cylinder. In this method, the effect of smoke and dust removal during forming may be ensured, and the metal powders may be prevented from being carried away by the circulating air flow and material waste is thereby prevented. Therefore, this method is suitable for high-efficiency, low-cost, and high-quality manufacturing of various ring-shaped pieces and frame-shaped pieces.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure. Further, the technical idea of the disclosure may also be easily extended to the laser powder bed fusion forming of various large-size ring-shaped and frame-shaped metal pieces with gradual or sudden changes in the shape of horizontal cross-sections. In the disclosure, only the projection breadth collection of the layers of such a metal piece on the horizontal section is required to be extracted and treated and processed as the horizontal cross-section of the metal piece.

What is claimed is:

1. A laser powder bed fusion forming device for a large-size ring/frame-shaped metal piece, comprising: a forming cylinder, a substrate, a galvanometer array, and at least one dust removal module, wherein the forming cylinder is ring/frame-shaped with an outer wall and an inner wall surrounded by the outer wall and is adapted to inner and outer contours of the large-size ring/frame-shaped metal piece to be formed, the substrate is also ring/frame-shaped and is arranged inside the forming cylinder, wherein the substrate is surrounded by the outer wall of the forming cylinder, the inner wall of the forming cylinder is surrounded by the substrate, and the outer wall and the inner wall are both in circular shapes or polygonal shapes, the galvanometer array is located above the forming cylinder and comprises a plurality of galvanometer systems, all corresponding scanning areas of the galvanometer systems cover an upper surface of the forming cylinder or all scanning areas cover the upper surface of the forming cylinder through movement of the galvanometer systems, such that simultaneous selective melting forming of the large-size ring or frame-shaped metal piece with a plurality of laser beams is implemented, the at least one dust removal module is located between the forming cylinder and the galvanometer array and is used for forming a circulating air flow field which is distributed along a radial direction of the inner wall or distributed radially along a circumscribed circle of a horizontal cross-section of the inner wall or distributed along a normal direction of each side of the inner wall, or for forming segments of a plurality of circulating air flow fields which are distributed in a circumferential direction of each side of the inner wall to accordingly achieve removal of smoke and dust.

2. The laser powder bed fusion forming device for the large-size ring/frame-shaped metal piece according to claim 1, wherein the at least one dust removal module comprises an air suctioning mechanism and an air blowing mechanism, wherein a shape of the air suctioning mechanism is adapted to an outer contour of the ring-shaped forming cylinder or a circumscribed circle of an outer contour of the frame-shaped forming cylinder, the air suctioning mechanism is located above an outer side of the forming cylinder and is provided with a plurality of air suctioning openings arranged into a ring shape, a shape of the air blowing mechanism is adapted to an inner contour of the ring-shaped forming cylinder or an inscribed circle of an inner contour of the frame-shaped forming cylinder, the air blowing mechanism is located above an inner side of the forming cylinder, is located on an inner side of the air suctioning mechanism, and is provided with air blowing openings corresponding to the air suctioning openings, the circulating air flow field which is distributed along the radial direction of the large-size ring-shaped metal piece or distributed radially along the circumscribed circle of the horizontal cross-section of the large-size frame-shaped metal piece is formed through matching of the air suctioning openings and the corresponding air blowing openings, alternatively, a shape of the air suctioning mechanism is adapted to the inner contour of the ring-shaped forming cylinder or the inscribed circle of the inner contour of the frame-shaped forming cylinder, the air suctioning mechanism is located above an inner side of the forming cylinder and is provided with a plurality of air suctioning openings arranged into a ring shape, a shape of the air blowing mechanism is adapted to an outer contour of the ring-shaped forming cylinder or a circumscribed circle of an outer contour of the frame-shaped forming cylinder, the air blowing mechanism is located above an outer side of the forming cylinder, is located on an outer side of the air suctioning mechanism, and is provided with air blowing openings corresponding to the air suctioning openings, the circulating air flow field which is distributed along the radial direction of the large-size ring-shaped metal piece or distributed radially along the circumscribed circle of the horizontal cross-section of the large-size frame-shaped metal piece is formed through matching of the air suctioning openings and the corresponding air blowing openings.

3. The laser powder bed fusion forming device for the large-size ring/frame-shaped metal piece according to claim 1, wherein when an object to be formed is the large-size frame-shaped metal piece, the at least one dust removal module comprises an air suctioning mechanism and an air blowing mechanism, wherein a shape of the air suctioning mechanism is adapted to an outer contour of the frame-shaped forming cylinder, the air suctioning mechanism is located above an outer side of the forming cylinder and is provided with a plurality of air suctioning openings parallel to the frame of the frame-shaped metal piece, a shape of the air blowing mechanism is adapted to an inner contour of the frame-shaped forming cylinder, the air blowing mechanism is located above an inner side of the forming cylinder, is located on an inner side of the air suctioning mechanism, and is provided with air blowing openings corresponding to the air suctioning openings, the circulating air flow field which is distributed along the normal direction of the frame of the large-size frame-shaped metal piece is formed through matching of the air suctioning openings and the corresponding air blowing openings, alternatively, a shape of the air suctioning mechanism is adapted to an inner contour of the frame-shaped forming cylinder, the air suctioning mechanism is located above an inner side of the forming cylinder and is provided with a plurality of air suctioning openings parallel to the frame of the metal piece, a shape of the air blowing mechanism is adapted to an outer contour of the frame-shaped forming cylinder, the air blowing mechanism is located above an outer side of the forming cylinder, is located on an outer side of the air suctioning mechanism, and is provided with air blowing openings corresponding to the air suctioning openings, the circulating air flow field which is distributed along the normal direction of the frame of the large-size frame-shaped metal piece is formed through matching of the air suctioning openings and the corresponding air blowing openings.

4. The laser powder bed fusion forming device for the large-size ring/frame-shaped metal piece according to claim 1, wherein the at least one dust removal module is a plurality of dust removal modules, a number of the plurality of dust removal modules is identical to a number of the galvanometer systems, and each of the plurality of dust removal modules is located under the corresponding galvanometer system and moves synchronously with the galvanometer system.

5. The laser powder bed fusion forming device for the large-size ring/frame-shaped metal piece according to claim 4, wherein each of the plurality of dust removal modules comprises an air suctioning mechanism and an air blowing mechanisms separately arranged on both sides of the galvanometer system, wherein the air suctioning mechanism is provided with a plurality of air suctioning openings, the air blowing mechanism is provided with air blowing openings corresponding to the air suctioning openings, the circulating air flow fields which are distributed in the circumferential direction of the large-size ring-shaped metal piece or distributed in the circumferential direction of the frame of the large-size frame-shaped metal piece are formed through matching of the air suctioning openings and the corresponding air blowing openings.

6. The laser powder bed fusion forming device for the large-size ring/frame-shaped metal piece according to claim 1, wherein a distance between an inner surface of an outer wall of the forming cylinder and an outer contour of a metal piece deposition layer is 0.1 mm to 150 mm, and a distance between an outer surface of an inner wall of the forming cylinder and an inner contour of the metal piece deposition layer is 0.1 mm to 150 mm.

7. The laser powder bed fusion forming device for the large-size ring/frame-shaped metal piece according to claim 1, wherein power and a beam diameter of a laser beam outputted by each galvanometer system are respectively controlled at 500 W to 10 kW and 0.1 mm to 10 mm, and the galvanometer system is a two-axis scanning galvanometer system or a dynamic focus scanning galvanometer system.

8. The laser powder bed fusion forming device for the large-size ring/frame-shaped metal piece according to claim 2, wherein an average flow velocity of the air flow fields formed between the air suctioning openings and the corresponding air blowing openings is 0.5 m/s to 5 m/s.

9. The laser powder bed fusion forming device for the large-size ring/frame-shaped metal piece according claim 1, wherein a distance between the at least one dust removal module and the upper surface of the forming cylinder is 1 mm to 300 mm, a distance between the air suctioning openings of the air suctioning mechanism and the corresponding air blowing openings of the corresponding air blowing mechanism is 5 mm to 500 mm, the forming device further comprises a workbench, and the forming cylinder is embedded in the workbench.

10. The laser powder bed fusion forming device for the large-size ring/frame-shaped metal piece according to claim 6, wherein the distance between the inner surface of the outer wall of the forming cylinder and the outer contour of the metal piece deposition layer is 1 mm to 20 mm, and the distance between the outer surface of the inner wall of the forming cylinder and the inner contour of the metal piece deposition layer is 1 mm to 20 mm.

11. The laser powder bed fusion forming device for the large-size ring/frame-shaped metal piece according to claim 8, wherein the average flow velocity of the air flow fields formed between the air suctioning openings and the corresponding air blowing openings is 1 m/s to 3 m/s.

12. The laser powder bed fusion forming device for the large-size ring/frame-shaped metal piece according claim 9, wherein the distance between the at least one dust removal module and the upper surface of the forming cylinder is 5 mm to 100 mm, the distance between the air suctioning openings of the air suctioning mechanism and the corresponding air blowing openings of the corresponding air blowing mechanism is 200 mm to 400 mm.

13. The laser powder bed fusion forming device for the large-size ring/frame-shaped metal piece according to claim 2, wherein a distance between an inner surface of an outer wall of the forming cylinder and an outer contour of a metal piece deposition layer is 0.1 mm to 150 mm, and a distance between an outer surface of an inner wall of the forming cylinder and an inner contour of the metal piece deposition layer is 0.1 mm to 150 mm.

14. The laser powder bed fusion forming device for the large-size ring/frame-shaped metal piece according to claim 13, wherein the distance between the inner surface of the outer wall of the forming cylinder and the outer contour of the metal piece deposition layer is 1 mm to 20 mm, and the distance between the outer surface of the inner wall of the forming cylinder and the inner contour of the metal piece deposition layer is 1 mm to 20 mm.

15. The laser powder bed fusion forming device for the large-size ring/frame-shaped metal piece according to claim 3, wherein a distance between an inner surface of an outer wall of the forming cylinder and an outer contour of a metal piece deposition layer is 0.1 mm to 150 mm, and a distance between an outer surface of an inner wall of the forming cylinder and an inner contour of the metal piece deposition layer is 0.1 mm to 150 mm.

16. The laser powder bed fusion forming device for the large-size ring/frame-shaped metal piece according to claim 6, wherein the distance between the inner surface of the outer wall of the forming cylinder and the outer contour of the metal piece deposition layer is 1 mm to 20 mm, and the distance between the outer surface of the inner wall of the forming cylinder and the inner contour of the metal piece deposition layer is 1 mm to 20 mm.

17. The laser powder bed fusion forming device for the large-size ring/frame-shaped metal piece according to claim 4, wherein a distance between an inner surface of an outer wall of the forming cylinder and an outer contour of a metal piece deposition layer is 0.1 mm to 150 mm, and a distance between an outer surface of an inner wall of the forming cylinder and an inner contour of the metal piece deposition layer is 0.1 mm to 150 mm.

18. The laser powder bed fusion forming device for the large-size ring/frame-shaped metal piece according to claim 17, wherein the distance between the inner surface of the outer wall of the forming cylinder and the outer contour of the metal piece deposition layer is 1 mm to 20 mm, and the distance between the outer surface of the inner wall of the forming cylinder and the inner contour of the metal piece deposition layer is 1 mm to 20 mm.

19. The laser powder bed fusion forming device for the large-size ring/frame-shaped metal piece according to claim 5, wherein a distance between an inner surface of an outer wall of the forming cylinder and an outer contour of a metal piece deposition layer is 0.1 mm to 150 mm, and a distance between an outer surface of an inner wall of the forming cylinder and an inner contour of the metal piece deposition layer is 0.1 mm to 150 mm.

\* \* \* \* \*